(12) United States Patent
Marlow et al.

(10) Patent No.: US 8,984,273 B2
(45) Date of Patent: Mar. 17, 2015

(54) METHOD TO PROVIDE SECURE MULTIMEDIA MESSAGING BETWEEN PEER SYSTEMS

(71) Applicant: Protected Mobility, LLC, Rockville, MD (US)

(72) Inventors: William J. Marlow, Herndon, VA (US); Robert Cichielo, Asbury, NJ (US); Emil Sturniolo, Medina, OH (US); Paul Benware, Mendon, NY (US)

(73) Assignee: Protected Mobility, LLC, Rockville, MD (US)

( * ) Notice: Subject to any disclaimer, the term of this patent is extended or adjusted under 35 U.S.C. 154(b) by 0 days.

(21) Appl. No.: 13/913,765

(22) Filed: Jun. 10, 2013

(65) Prior Publication Data

US 2013/0346750 A1 Dec. 26, 2013

Related U.S. Application Data

(63) Continuation-in-part of application No. 13/328,706, filed on Dec. 16, 2011.

(60) Provisional application No. 61/657,164, filed on Jun. 8, 2012.

(51) Int. Cl.
*H04L 29/06* (2006.01)
*H04L 9/08* (2006.01)
(Continued)

(52) U.S. Cl.
CPC .......... *H04L 63/0428* (2013.01); *H04L 9/0822* (2013.01); *G06F 21/606* (2013.01); *H04L 63/06* (2013.01); *H04L 51/38* (2013.01); *H04L 2209/60* (2013.01); *H04L 51/08* (2013.01)

USPC ......... 713/150; 726/1; 726/3; 726/13; 726/21

(58) Field of Classification Search
CPC ............. G06F 3/01; G06F 3/048; G06F 3/16; H04L 63/0428
USPC ....................................................... 713/150
See application file for complete search history.

(56) References Cited

U.S. PATENT DOCUMENTS

| 5,592,555 A | 1/1997 | Stewart |
| 6,125,281 A | 9/2000 | Wells et al. |

(Continued)

FOREIGN PATENT DOCUMENTS

WO    WO 0195558    0/0000

OTHER PUBLICATIONS

Kaced et al., SEMAFOR: A Framework for Authentication of Aadaptive Multimedia Content and Delivery for Heterogeneous Networks, Aug. 2006, International Conference on Internet Surveillance and Protection, ICISP '06, pp. 28-31.*

(Continued)

*Primary Examiner* — Mohammad L Rahman
*Assistant Examiner* — Kenneth Chang
(74) *Attorney, Agent, or Firm* — Nixon & Vanderhye P.C.

(57) ABSTRACT

A lightweight solution enables the exchange of multimedia information in a secure manner. Exchanged cryptographic material can be used to encipher multimedia message-oriented communications between devices. This lightweight solution can be used by common off the shelf devices such as smartphones, tablets, feature phones, or special purpose machine to machine devices for private communications, such as command and control, location services, video, audio, electronic attachments, etc. using insecure voice or data communication paths, such as MMS.

1 Claim, 21 Drawing Sheets

(51) Int. Cl.
*G06F 21/60* (2013.01)
*H04L 12/58* (2006.01)

(56) References Cited

U.S. PATENT DOCUMENTS

| | | | |
|---|---|---|---|
| 6,356,937 | B1 | 3/2002 | Montville et al. |
| 7,076,657 | B2 | 7/2006 | Koukoulidis et al. |
| 7,424,615 | B1 | 9/2008 | Jalbert et al. |
| 7,702,898 | B2 | 4/2010 | Tan |
| 8,064,606 | B2 | 11/2011 | Schuba et al. |
| 8,386,800 | B2 | 2/2013 | Kocher et al. |
| 8,464,061 | B2 | 6/2013 | Bradley |
| 2002/0123967 | A1 | 9/2002 | Wang |
| 2004/0048627 | A1* | 3/2004 | Olvera-Hernandez ........ 455/466 |
| 2004/0171369 | A1 | 9/2004 | Little et al. |
| 2005/0069096 | A1* | 3/2005 | Claudatos et al. ......... 379/88.08 |
| 2005/0232422 | A1 | 10/2005 | Lin et al. |
| 2006/0158460 | A1 | 7/2006 | Uh |
| 2006/0246956 | A1 | 11/2006 | Park et al. |
| 2007/0016781 | A1* | 1/2007 | Asokan et al. ................ 713/173 |
| 2007/0022295 | A1 | 1/2007 | Little et al. |
| 2007/0072564 | A1 | 3/2007 | Adams |
| 2007/0083766 | A1 | 4/2007 | Farnham et al. |
| 2007/0185815 | A1 | 8/2007 | Boccon-Gibod et al. |
| 2007/0258584 | A1* | 11/2007 | Brown et al. .................... 380/43 |
| 2008/0313458 | A1 | 12/2008 | Fascenda et al. |
| 2009/0055643 | A1 | 2/2009 | Brown et al. |
| 2009/0088068 | A1* | 4/2009 | Ferrazzini et al. ........... 455/3.06 |
| 2009/0169013 | A1 | 7/2009 | Fascenda et al. |
| 2009/0185677 | A1 | 7/2009 | Bugbee |
| 2009/0228707 | A1 | 9/2009 | Linsky |
| 2009/0265552 | A1 | 10/2009 | Moshir et al. |
| 2009/0268902 | A1 | 10/2009 | Fascenda et al. |
| 2010/0020972 | A1 | 1/2010 | Baugher et al. |
| 2010/0159962 | A1 | 6/2010 | Cai et al. |
| 2011/0026714 | A1* | 2/2011 | Thomas et al. ............... 380/278 |
| 2011/0138170 | A1 | 6/2011 | Fascenda et al. |
| 2011/0138172 | A1 | 6/2011 | McCreight et al. |
| 2011/0194695 | A1 | 8/2011 | Fascenda et al. |
| 2011/0231659 | A1* | 9/2011 | Sinha ............................ 713/168 |
| 2012/0054493 | A1 | 3/2012 | Bradley |
| 2012/0239417 | A1 | 9/2012 | Pourfallah et al. |
| 2012/0239560 | A1 | 9/2012 | Pourfallah et al. |
| 2013/0030828 | A1 | 1/2013 | Pourfallah et al. |

OTHER PUBLICATIONS

May 23, 2014 Office Action in U.S. Appl. No. 13/670,994.
Nov. 15, 2013 & Apr. 30, 2014 Office Actions in U.S. Appl. No. 13/670,925.
Aug. 16, 2012 & Oct. 4, 2013 Office Actions in U.S. Appl. No. 12/940,213.
Aug. 1, 2013 & Mar. 7, 2014 Office Actions in U.S. Appl. No. 13/328,706.
Feb. 25, 2014 Office Action in U.S. Appl. No. 13/671,054.

* cited by examiner

METHOD TO PROVIDE SECURE MULTIMEDIA MESSAGING BETWEEN PEER SYSTEMS

CROSS-REFERENCES TO RELATED APPLICATIONS

This application is a continuation-in-part of U.S. patent application Ser. No. 13/328,706 filed 16 Dec. 2011, incorporated herein by reference. It claims priority from Provisional Application No. 61/657,164 filed 8 Jun. 2012, also incorporated herein by reference.

STATEMENT REGARDING FEDERALLY SPONSORED RESEARCH OR DEVELOPMENT

Field

The technology herein relates to multimedia messaging services, and more particularly to secure exchange of data including but not limited to audio, video, slideshows, text, documents, files, attachments, and any other data, between devices capable of using messaging services.

BACKGROUND AND SUMMARY

In addition to traditional Short Message Service ("SMS")—see e.g., co-pending U.S. patent application Ser. No. 12/940,213 filed Nov. 5, 2010; which claims priority from U.S. Provisional Patent Application No. 61/351,979 filed Jun. 7, 2010, incorporated herein by reference—many computing devices (hand-held, desktop, mobile, tablet, and other) are equipped with multimedia capabilities (such as for example cameras, audio recording devices, microphones, sensors, accelerometers, GPS, etc.). Additional components that are coupled to or are part of the device enable the capture of various data including, but not limited to: images, audio, video, location, time, temperature, acceleration, etc. As an extension to these short messaging services, standards have been developed by many organizations such as The $3^{rd}$ Generation Partnership Project (3gpp) to allow for the exchange of information captured by these multimedia capabilities between computing devices.

Owners of these devices regularly snap digital photographs, record a video or audio segment, enter in more than a just few words of text, and transfer that information to another device over a network or otherwise using for example Multimedia Messaging Service or "MMS". See for example the specifications at the following URL that are hereby incorporated by reference: http://www.openmobilealliance.org/Technical/release_program/mm s_v1_3.aspx Multimedia messaging provides numerous advantages in terms of convenience and cost. In one non-limiting illustrative embodiment, many cellular carriers offer the exchange of multimedia message at no additional cost to a particular consumer's rate plan. Using the multimedia messaging service available to the computing devices over at least one cellular carrier network, may reduce the cost of sending this type of information in lieu of having an expensive carrier Internet access or private data services plan.

However, this multimedia or other information is often communicated without protection or security. Communicating the information with no security allows malicious or nefarious parties to view the contents of the message, forward it to others, and modify the content to something different than what was transmitted.

Therefore it would be highly desirable to develop a system where the multimedia content could be exchanged in a way that would at least allow for the detection of any modification, and at best be protect it from being viewed or tampered with by such nefarious or malicious parties ("attackers"), using existing messaging standards or infrastructure.

While it would be highly desirable to provide secure multimedia messaging, there are challenges to doing so. In particular, many communications service providers render/modify content to match what they perceive the capabilities are of the receiving device(s) as part of their multimedia messaging services. This artifact is based upon the concept that the messaging infrastructure has knowledge (a priori or otherwise) about what a receiving device's capability is. However, with the advancement of technology, many end devices such as smart phones, mobile devices, tablets, computers, or headless sensor devices, etc., can have their capabilities upgraded or changed by modifying/adding software and/or coupling additional hardware components to them, thus expanding their capability beyond the infrastructures' understanding. Therefore, any rendering/translation process may present a problem when transmitting content, as any intermediary nodes on the path(s) between the communicating end node devices may modify the data stream. Therefore, it may be desirable to take steps to allow the information to be exchange in a way that helps reduce the possibility that any intermediary device will overtly or inadvertently modify the content of the multimedia message.

Additional limitations such as size of the content may also be enforced by the intervening infrastructure. It may be desirable to ensure that any security process does not add significantly to the overhead associated with sending a message.

Other difficulties may also exist when sending information securely. As one example, to transfer this information securely, cryptographic transforms may be applied. Given the potential limited processing power of peer or other receiving systems, judicious use of such cryptographic transforms may be considered that mitigate potential attack vectors and do not over burden the end or receiving node device's computing platform.

While much work has been done in the past, there remains a long-felt but unsolved need for effective, robust secure techniques for exchanging multimedia information over cellular, Internet and other messaging services.

The exemplary illustrative non-limiting technology herein describes non-limiting cryptographic processes and algorithms associated with a non-limiting example "protected MMS" that allows for a lightweight peer-to-peer or other exchange of messages or communiqués containing at least one multimedia content over insecure communications links.

One example non-limiting implementation provides methods of exchanging at least one part multimedia information being communicated between a first messaging device and at least one second messaging device involving generating at least one set of cryptographic material used to transform a first message, encrypting the at least one cryptographic set of cryptographic material using a different cryptographic set of cryptographic material, including the at least one set of cryptographic material as part of a second message loosely coupled with the first message, communicating the first transformed message to the peer device, communicating the second message to the peer device, the receiving peer device transforms the information in second message to recover the at least one set of cryptographic material, then using the at least one set of cryptographic material to recover the transformed the at least one part multimedia message.

The exemplary illustrative technology herein can be used to avoid cryptographic collision of data and/or the cryptographic material to increase the level of security. In one example non-limiting illustrative implementation, an at least one ephemeral cryptographic key is associated with the at least one part of multimedia information. In this way, using a one-time pad, even if the same multimedia content were to be communicated again, the transformed ciphered text of the message would be different.

The exemplary illustrative non-limiting light-weight technology herein is able to implement secure multimedia messaging technology using a small amount of additional computational power of the type available on low-cost portable, mobile or any other end-to-end devices (e.g., any embedded processing technology) and while minimizing communication overhead. For example, the exemplary illustrative non-limiting technology provides a reduced or minimal message encapsulation having low consumption of available message payload. As one non-limiting example, some messaging services limit the actual size of the multimedia messaging to be 307,200 bytes of information (300 KB). Adding any additional overhead may cause the messaging service to discard the Multimedia message (MMS). Using a symmetric cryptographic algorithm such as AES (Advanced Encryption Standard) in GCM (Galois/counter) mode of operation allows for no expansion of the original content. However without a priori knowledge of the cryptographic material used to transform the message content, the at least one part transformed multimedia message is of no value. Therefore the cryptographic material is in a non-limiting example transferred to the at least one peer system. For example, by sending an associated loosely coupled secure message via the SMS services, the at least one part secure MMS message can be transferred without increasing the overhead. The peer device can then decode the secure SMS message to recover the cryptographic materials used to encode the MMS message. It can then proceed to recover the at least one part multimedia information. It is to be understood by those skilled in the art, that the loosely coupled messages do not have to be sent together or even through the same path or service. For example, the multimedia message could be sent via standard Internet based email or file transfer utilities which may allow for larger messages to be communicated while the cryptographic material used to encode the secure message may be transferred via an SMS channel. The cryptographic material may also be exchanged through alternate channels such as physically via a secure digital storage card. Many other permutations can be employed, including but not limited to sending the first and second messages in the same communications envelope.

As indicated previously, intermediary attackers and associated devices may attempt to interpolate and/or modify the content of the at least one part multimedia message. If in fact the message is changed, this can present a significant problem, as the transformation process will be unable to be reversed if certain portions of the content are changed or modified in some way. Therefore, the originating system may in some example non-limiting implementations use an alternative encapsulation to a different format that may not require any interpolation of the data, or a format that has a known algorithm of modification. This could involve sending the content as a textual representation of the transformed data instead of the original binary data. Other encapsulations could also provide similar results depending on the behavior of the intervening systems. Obfuscating the data in this manner may allow the data to be communicated efficiently between peers without changes to the intervening messaging service.

Exemplary illustrative non-limiting implementations provides unique combinations of:
- technology that works successfully and securely for constrained multimedia message lengths;
- ability to exchange secure multimedia content information through a bandwidth-challenged interface in a way that is not onerous on the users who are sending and receiving secure messages;
- no additional infrastructure required beyond conventional components already in place for exchanging messages;
- low computational requirements enabling security on a wide variety of different platforms including very inexpensive devices;
- other.

In simple terms, an illustrative non-limiting protected MMS embodiment can be used to protect data content in MMS, Skype, or various other messaging methodologies. Furthermore, this technology can be used to protect message oriented communications such as picture messages, email messages, other text documents/attachments, command and control messages, alerts messages, machine to machine messages, video clips, audio clips, etc.

The illustrative non-limiting protected MMS provides a mobile or portable device with an ability to encrypt and decrypt messages exchanged with other users and devices who also have access to the Protected MMS protocols and application algorithms. Non-limiting technical overviews and detailed descriptions of example non-limiting cryptographic technology and techniques employed to secure MMS traffic are provided. One example non-limiting target platform with which the present technology can be useful as of this filing is the Google Android operating system, Apple iPhones and iPads, or any desired MMS or other messaging platforms, but various other existing and/or not-yet-developed platforms can benefit from and use the technology herein to provide advantageous secure messaging.

Thus, given the rise in popularity of communicating personal, private, sensitive, or vital peer-to-peer or peer-to-group information over insecure multimedia messaging infrastructure, it would be highly desirable to provide a lightweight solution that enables the exchange of multimedia information in a secure manner. The non-limiting technology herein provides systems and methods for the exchange of cryptographic material that can be used to encipher multimedia message-oriented communications between at least two peer devices. Once the cryptographic material is exchanged between cooperating peers, this lightweight solution can be used by common off the shelf hardware such as smartphones, tablets, feature phones, or special purpose machine to machine devices for private communications, such as command and control, location services, video, audio, electronic attachments, etc. using insecure voice or data communication paths, such as MMS.

BRIEF DESCRIPTION OF THE DRAWINGS

These and other features and advantages will be better and more completely understood by referring to the following detailed description of exemplary non-limiting illustrative embodiments in conjunction with the drawings of which.

DETAILED DESCRIPTION

Example Protected Mobility Multimedia Message application

Figure 1:
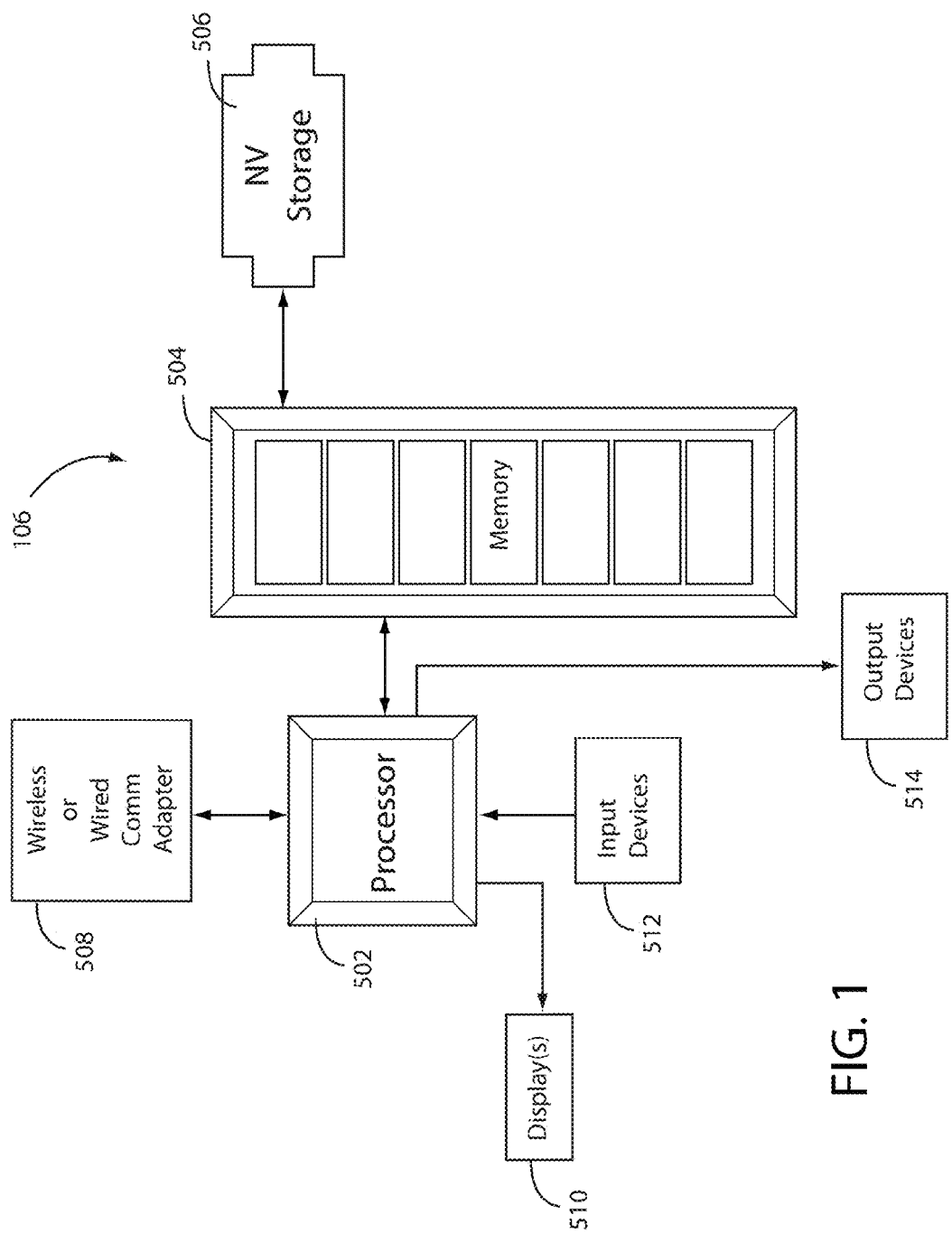
FIG. 1 shows an example non-limiting hardware architecture.

FIG. 1 shows an exemplary illustrative non-limiting end-user device 106 including, for example, a processor 502, a memory 504, and non-volatile storage 506. In the example shown, the processor 502 communicates with memory 504, and non-volatile storage 506 may also communicate with the processor either directly or through memory 504. The processor may communicate with the outside world via a wireless or wired communications adapter 508. A user may communicate with device 106 through a user interface provided for example by display or displays 510, input devices 512 and output devices 514. The display or displays 510 may comprise for example liquid crystal displays, plasma displays, rasterized displays, touch screens, or any other variation or other conventional display device. Input devices may include input keys, touch screen keys, pushbuttons, virtual buttons displayed on a touchscreen, a microphone for receiving voice activated commands, accelerometers or other motion detectors, light sensors (with or without pattern recognition capabilities), barcode readers, or any other device capable of conveying information to processor 502. Output devices 514 may include indicator lights, audio speakers, laser outputs, tactile output devices, printers, light projectors, feedback devices or any other output device desirable to provide a humanly perceivable or other output indicia.

In the example shown, the memory 504 may contain a variety of programs and data for manipulation and/or execution by processor 502. Non-volatile, non-transitory storage 506 (which in some exemplary or illustrative implementations may comprise a SIM card, SD card, magnetic disk, optical memory, flash memory, Disk, EPROM, PROM, SSD or any other non-volatile storage device) may supply programs including applications ("apps") to memory 504 for execution by processor 502. Storage or memory is used to maintain the data structures, messages and applications, and the processor executes the application from memory. For example, memory 504 in conjunction with non-volatile storage 506 may store data structures that link user identification information (e.g., telephone number, IP address, email address, name, other unique or non-unique identifier) with associated public keys or other material used for cryptographic operations. Any number of such records 602 may be stored in non-volatile storage 506 and/or memory 504. Different cryptographic material can be associated with different applications if desired, so that for example one public key could be used to communicate with Alice securely via texting, while a different public key could be used for communicating with her via her IP address, etc. Additional data structures stored in the memory may comprise a key ring (e.g., in disk/memory/secure storage) that includes one or a plurality of key ring elements, each comprising for example Contact, Public Key, Key Continuity Value, Other). Furthermore, some material used for cryptographic operations for example, a symmetric cryptographic key, may be derived from the information associated with the key ring elements.

Figure 1A:
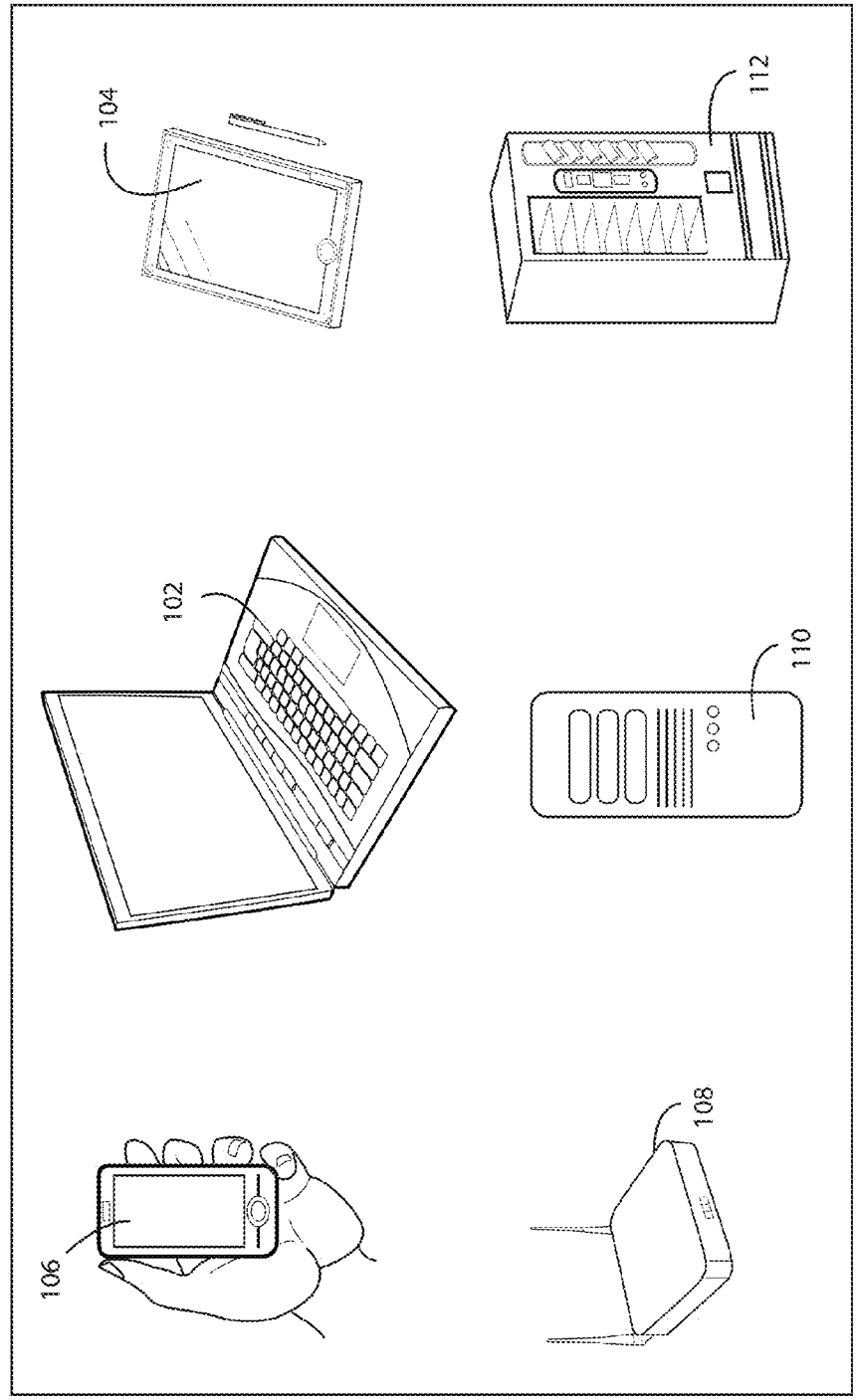
FIG. 1A shows example non-limiting user device form factors.

The form factor of device 106 can be any of a variety of different shapes and sizes such as shown in FIG. 1A, including for example wireless or wired laptop computers 102, tablet computers 104, personal digital assistants or cell phones 106, routers 108, or virtually any other kind of device such as 110, 112. Any devices may have a need to communicate messages with any other device. Different user interface arrangements can be used for each of the different form factors of devices 106 as desired.

The exemplary illustrative non-limiting technology herein provides non-limiting cryptographic processes and algorithms associated with an example non-limiting protected MMS that allows for a lightweight peer-to-peer exchange of messages or communiqué s containing at least one multimedia content over insecure communications links.

Non-limiting illustrative implementations may provide certain user interface features across a wide variety of device form factors, operating systems, functionalities, hardware capabilities and particular applications, that enable user manipulation and use of both secure and insecure multimedia messaging capabilities. For example, one desirable feature is the ability of a user to easily detect whether particular multimedia content was sent securely or insecurely as well as control whether multimedia content is to be sent securely or insecurely. Further non-limiting useful functionality allows selection of notification features (e.g., to keep receipt of a new secure multimedia message secret from onlookers). A further useful non-limiting feature enables seamless integration of secure/insecure messaging user interface as provided by the referenced protected SMS application with secure/insecure multimedia message handling present in the exemplary protected MMS application along with capabilities that may already be present on a particular device.

Figure 19:
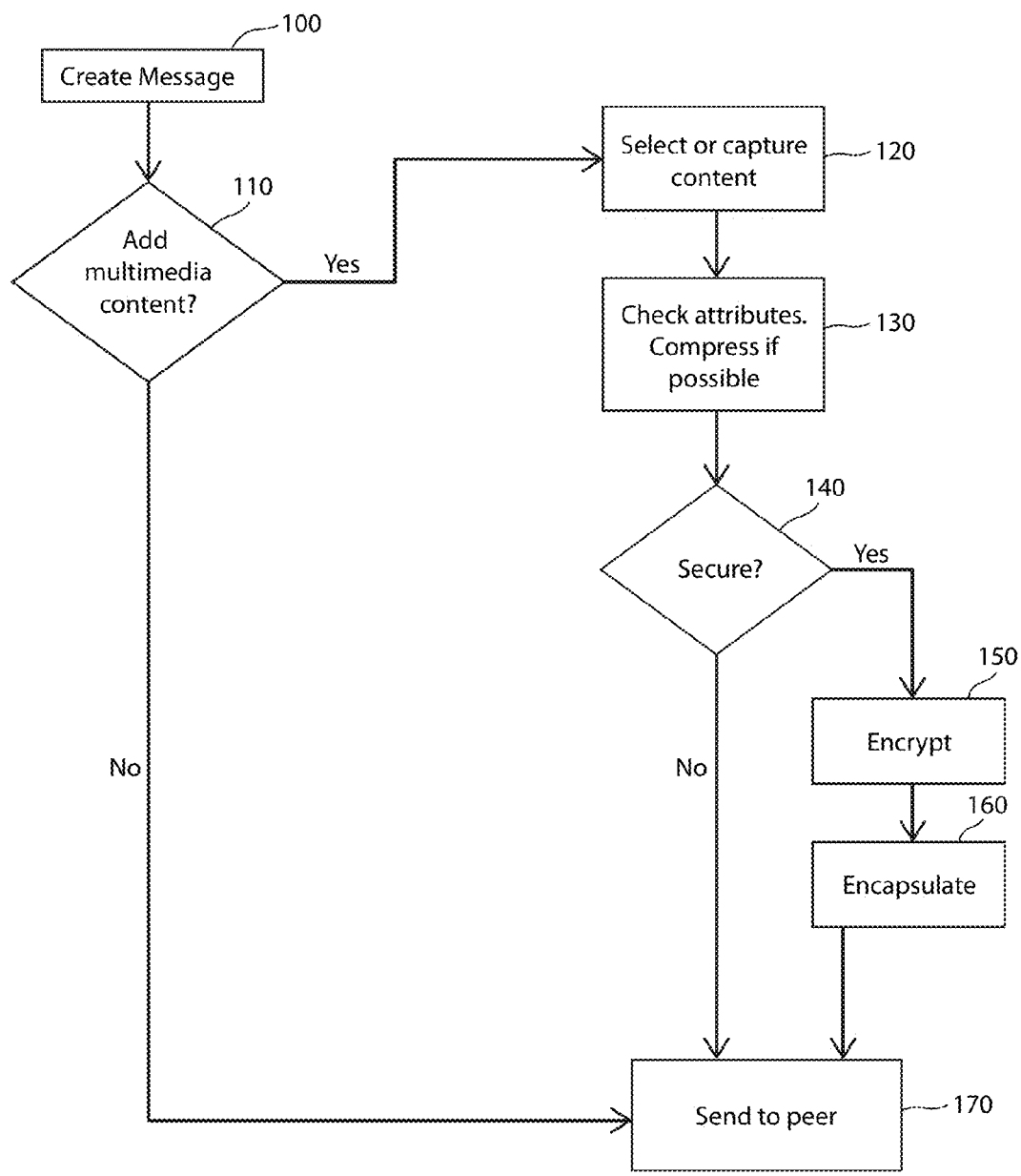
FIGS. 19 and 20 are non-limiting illustrative examples of flowcharts depicting automatically-executed instructions stored in a non-transitory memory device.

Referring to the non-limiting example FIG. 19 flowchart (which represents instructions stored in non-volatile and/or volatile storage 504, 506 and executed automatically by processor 502), a user or application begins the process of communicating a message to the at least one peer. At step 100, a create message operation is enacted. During the create message operation, in one exemplary embodiment, at step 110, a choice is executed on whether or not multimedia content will be added to the communiqué. If no additional content is added or the size of the messages does not exceed infrastructure limitations, the system proceeds to step 160. It is to be understood that additional non-limiting transforms on any message content as described in U.S. patent application Ser. No. 12/940,213 may take place between steps 110 and 170 when no multimedia content is being added and specifically are not being described herein for the sake of brevity.

If multimedia content is being added to the communiqué, the system proceeds to step 120. If no content is initially provided on entry to step 100, the system may query the user to either select existing content or capture new content to be attached to the communiqué. Once the content is determined, the system proceeds to step 130 to check its attributes. Due to infrastructure capabilities, certain attributes such as size, content type, etc. may be determined to see if it is suitable for transmission to the at least one peer. In one non-limiting exemplary implementation, a digital photographic image may be re-rendered to further compress its size to fit within the infrastructure's capabilities. This may for example take the form of transcoding the image from a lossless compression algorithm such as Portable Network Graphics (PNG) to a loss-full compression algorithm such as ones developed by the Joint Photographic Experts Group (JPEG). Other such transforms may take place on other content such as video, audio, or text to further reduce the size of the content. If after the attributes and/or compression function is executed, and the content is not suitable for transmission, an error may be returned to the user or calling function to alert it of the status.

If out of step 130 the content is deemed suitable for transmission to the at least one peer, operation proceeds to step 140. At step 140, if the message is to be sent without additional security, the communiqué is forwarded to the at least one peer, potentially over a variety of communications mediums including but not limited to data communications channels, email, via removable storage, etc. (step 170). If however additional security is to be applied to the content of the communiqué, operation proceeds to step 150. Depending on the non-limiting exemplary implementation step 150 may obtain the cryptographic material via access to the previously described key-ring database, or the credential material may be supplied by the calling function. Furthermore, additional cryptographic material may be generated to encipher at least one portion of the content, and the generated cryptographic material may then be enciphered with the shared cryptographic material between the at least one peer system. The enciphered generated cryptographic material can then be forwarded to the at least one peer as well as the enciphered content via the same or different communications methodologies.

The output of step 150's enciphering process is normally a stream of pseudo random data that may not conform to the initial encapsulation of the message content. To enable the encrypted stream to pass through existing infrastructure, an additional encapsulation layer may need to be applied. In one non-limiting exemplary implementation, at step 160 the encrypted data stream is encapsulated into a digital image stream such as being wrapped within a PNG format. Alternative encapsulations may also be available such as printable ASCII text stream. It should be understood that other alternative encapsulation methods can be easily envisioned by those skilled in the art.

Once re-encapsulated, the communiqué can then be transferred to the at least one peer at step 170.

Figure 20:
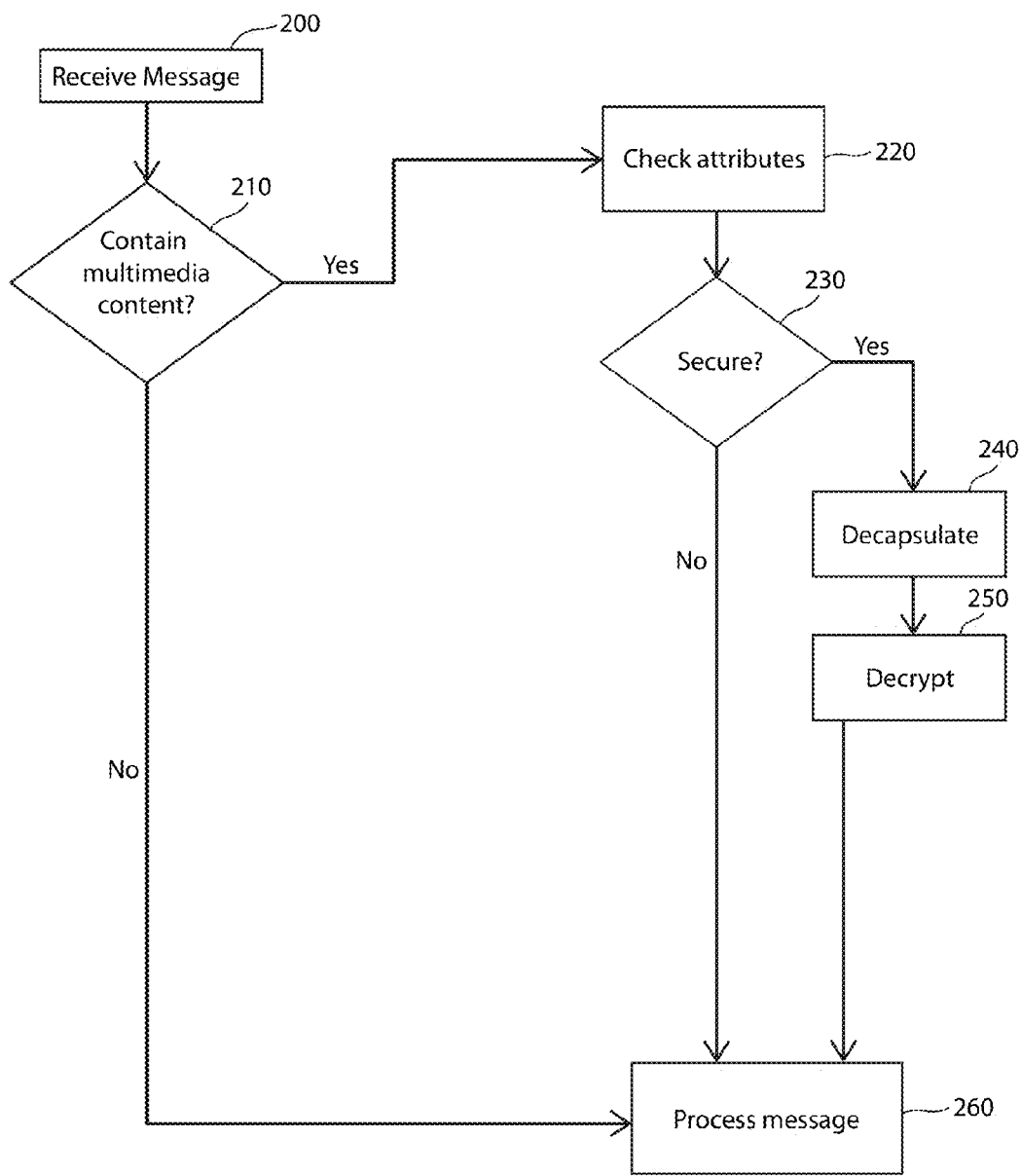

Upon reception of a communiqué (FIG. 20 step 200—this additional non-limiting flowchart representing program instructions stored in a memory 504, 506 of the same or different device and automatically executed by the same or different processor 502), the system determines if there is multimedia content attached (step 210). If no multimedia content is attached, operation proceeds to step 260. It is to be understood that additional non-limiting transforms on any message content as described in U.S. patent application Ser. No. 12/940,213 may take place between steps 210 and 260 when no multimedia content is received.

If multimedia content is available, operations proceed to step 220 to check its validity. Based on the attributes of the message and if the messages is properly encoded operation proceeds to step 230 to determine if the communiqué contains at least one part of encrypted content. If no encrypted content is determined, operation proceeds to step 260 for further processing of the message. In one non-limiting example, if the content received was a digital image, the information contained within the message may be displayed to the user. If however the message is deemed to contain secured content, operation proceeds to step 240. At step 240, an additional encapsulation is removed from the at least one part secured content to present the enciphered data stream. The enciphered data stream along with the cryptographic material used to encipher the data is passed to step 250. At step 250, the encrypted stream is decoded back into its clear text representation. In one exemplary non-limiting implementation, the output of step 250 may then be merged with portions of the unsecured communiqué including but not limited to the origination address of the message. The merged content will then be passed to step 260 for further processing of the system.

Example Non-Limiting User Interface Features

Figure 2:
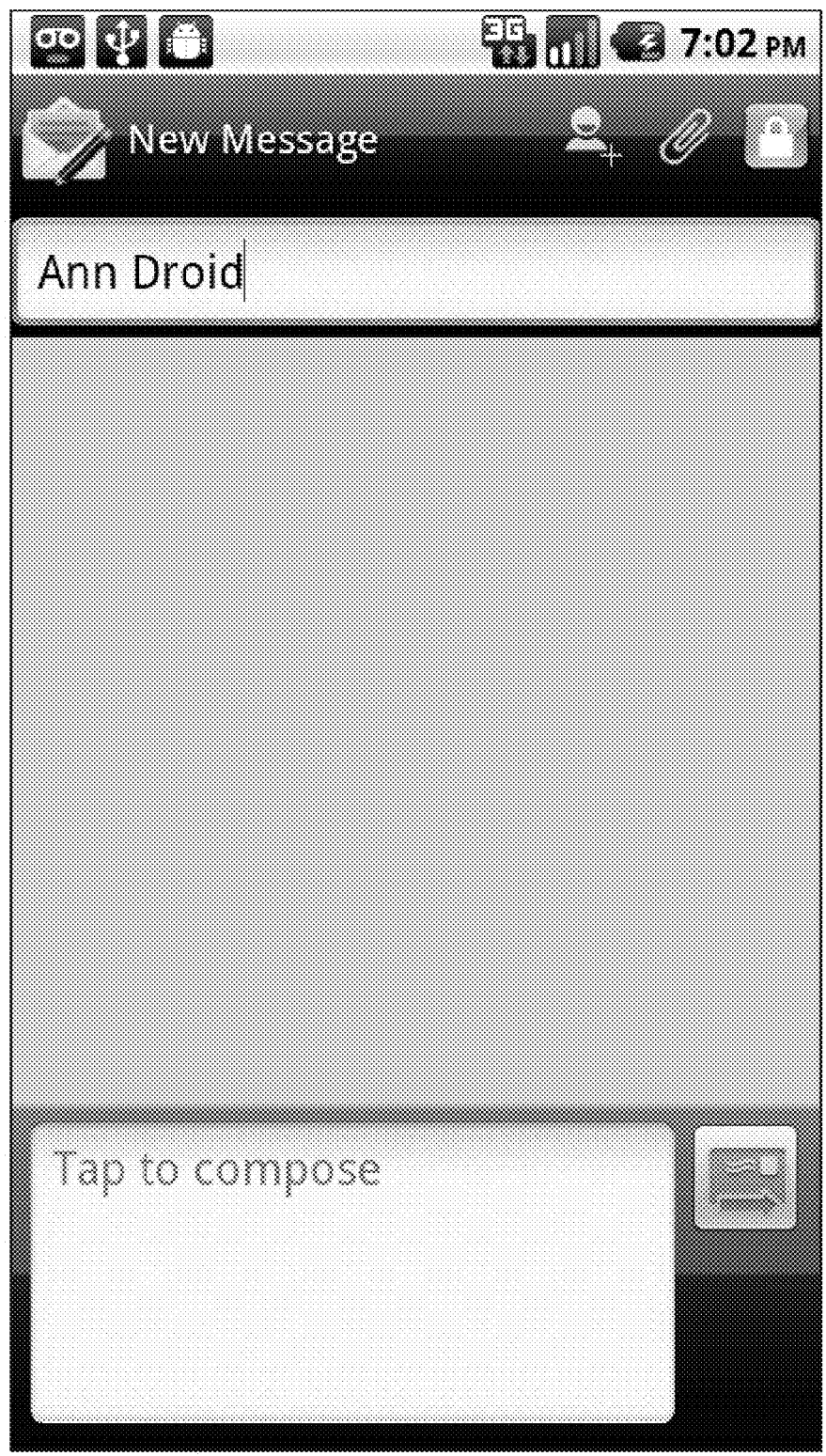
FIG. 2 is a non-limiting illustrative example of an input screen allowing a user to create a new communiqué.
Figure 3:
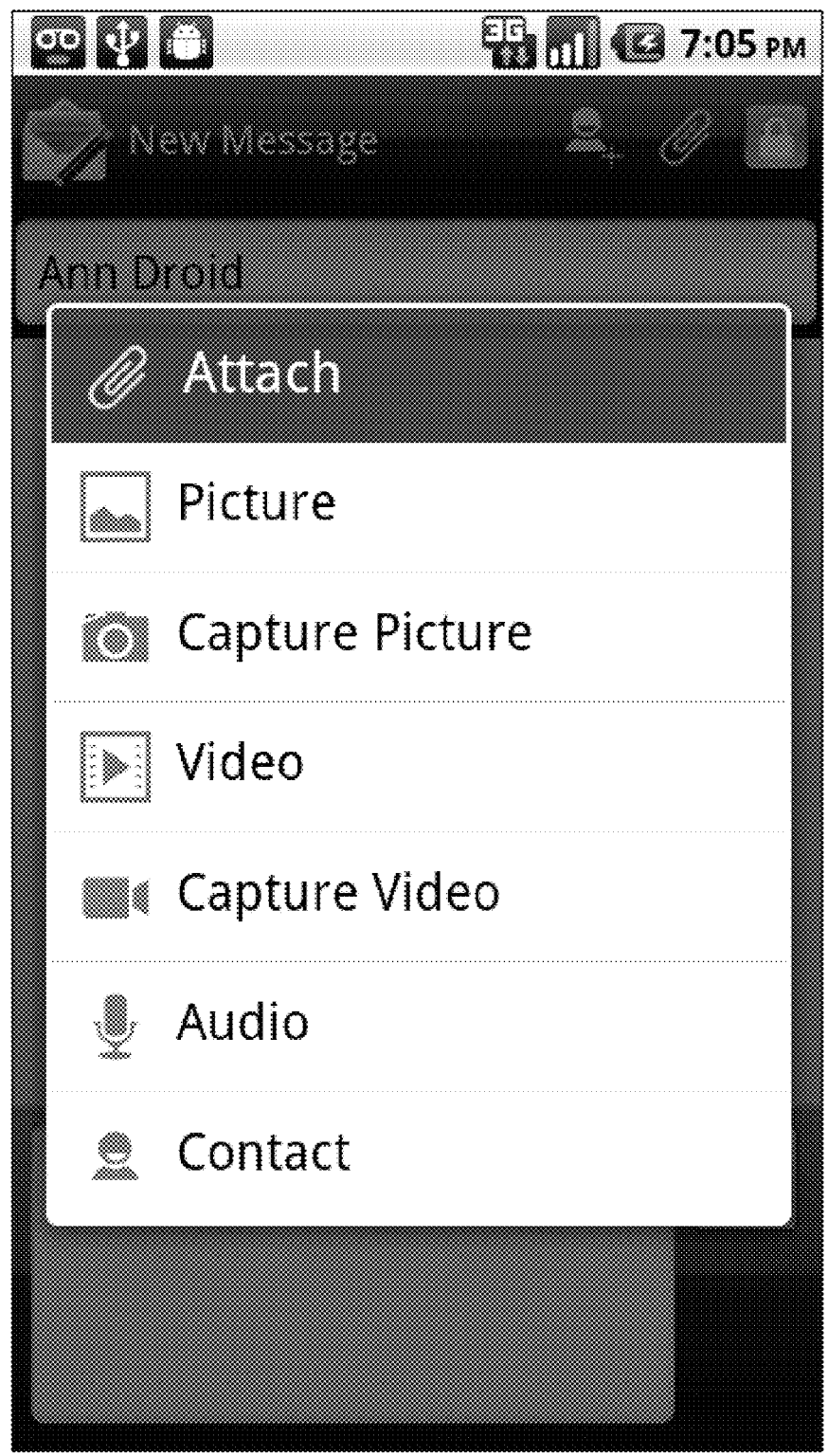
FIG. 3 is a non-limiting illustrative example of a list of attachment types that a consumer can attach to a communiqué.
Figure 4:
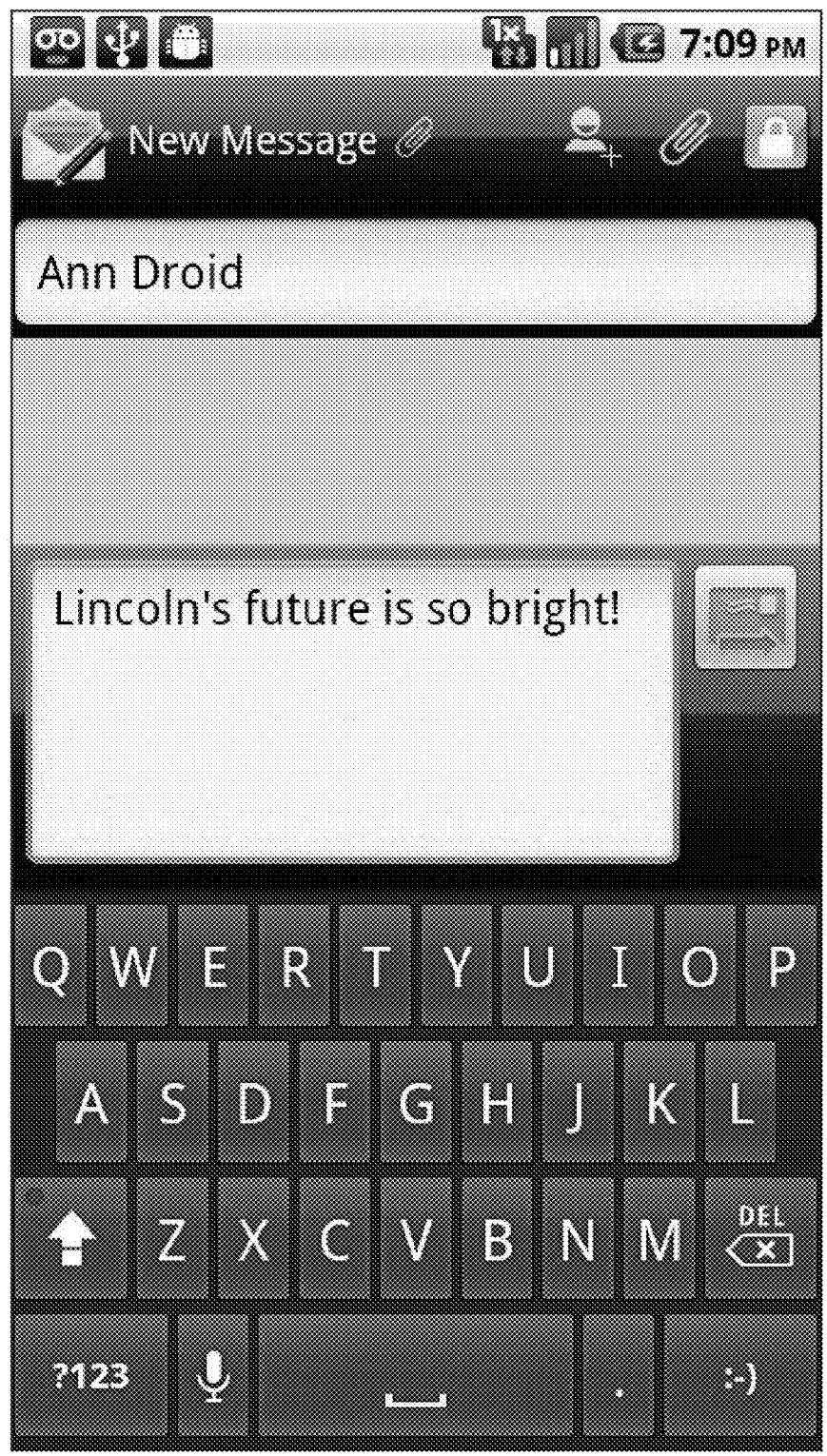
FIG. 4 is a non-limiting illustrative example of an input screen allowing a consumer to add textual information to a communiqué that also has at least one attachment.

Further understanding of these processes may be gained by reviewing FIGS. 2 through 18. FIG. 2 depicts a user interface on a touch screen based device such as one running the Google Android operating system, allowing a user to create a new communiqué. In this non-limiting exemplary implementation, a paperclip icon is displayed to allow a user to attach additional content to a textual based message. Once a user taps the paperclip on this touch screen device, a menu of options is displayed to the user as depicted in FIG. 3. The user now has the ability to navigate what type of multimedia content to attach to the message. Other types of documents or attachments could also be easily envisioned by those skilled in the art, including but not limited to:
  power point slide presentations
  portable document format files
  digital slide show
  photo stream
  moving pictures
  other Upon selecting or capturing the new multimedia content, the user is returned to the message screen, FIG. 4. The display at this point has been updated to indicate to the user that at least one attachment has been added to the communiqué with an additional paperclip next to the "New Message" title. The user may also enter in a textual message to be sent along with multimedia content as depicted by the text input area on the bottom of the display.

As described in co-pending U.S. patent application Ser. No. 13/328,706, in this non limiting exemplary implementation the user has control over whether or not to send the selected content and/or textual information securely by touching the lock icon in the top right hand corner of the display. If the icon is toggled to a grey representation, security is disabled. If the icon appears gold as in FIG. 4, the message content will be communicated securely.

Figure 5:
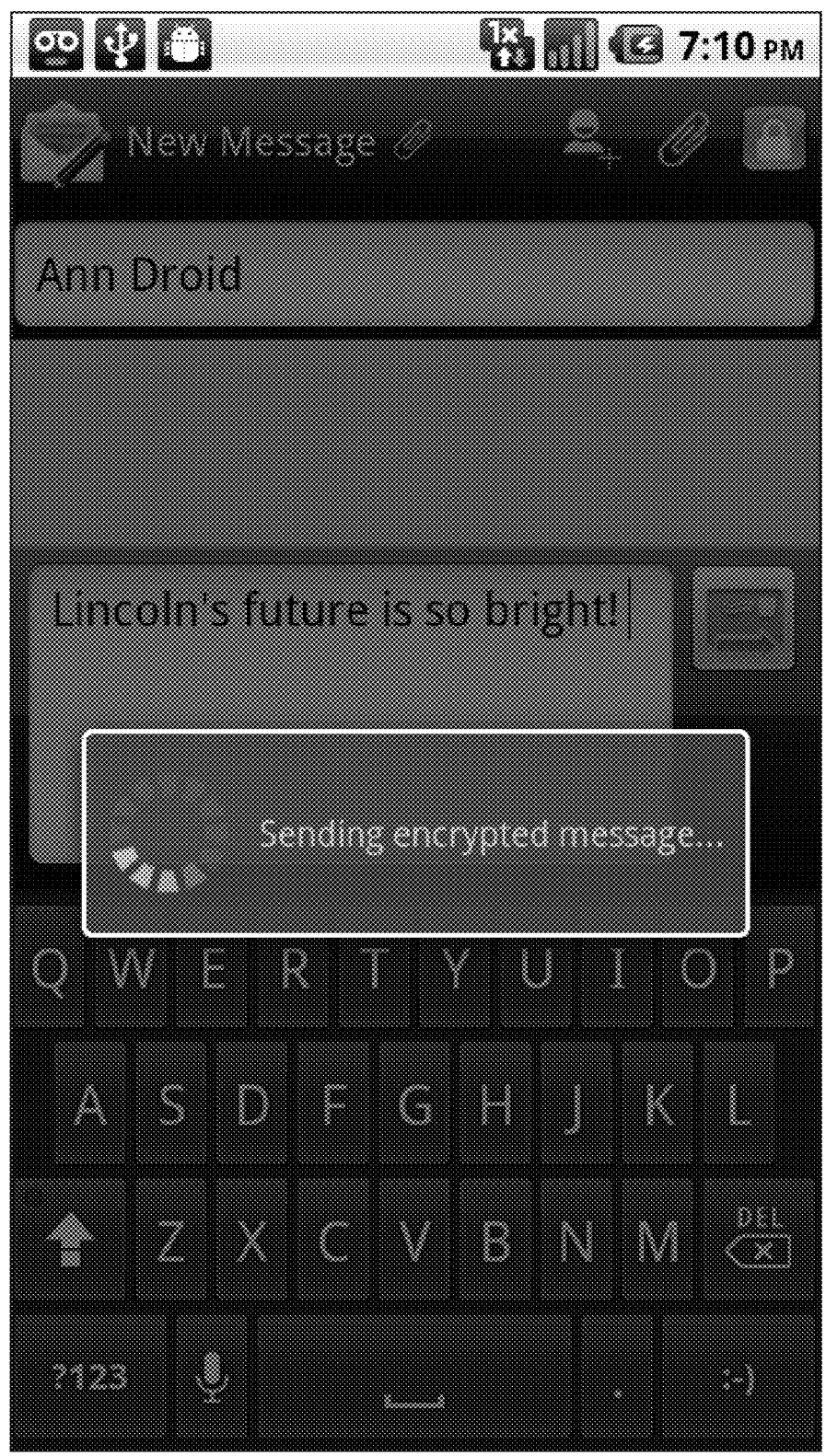
FIG. 5 is a non-limiting illustrative example of a status screen indicating that a secure communiqué is being sent to the at least one selected peer.

In the non-limiting exemplary implementation FIG. 5 depicts an information display indicating to the user that the communiqué created is being transferred securely between the at least one peer system.

Figure 6:
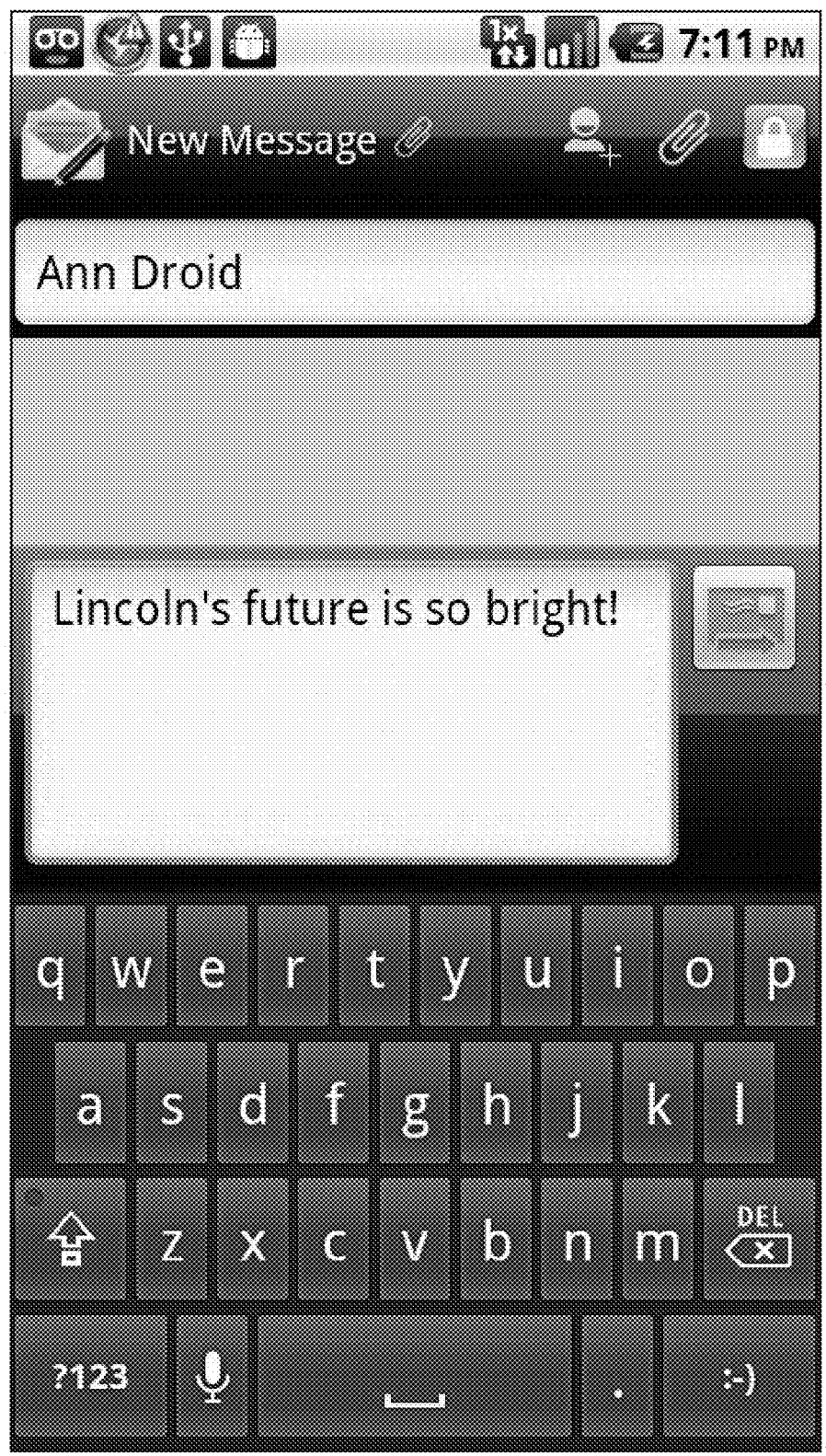
FIG. 6 is a non-limiting illustrative example of an error indication that a secure communiqué was not successfully sent to the at least one selected peer.
Figure 7:
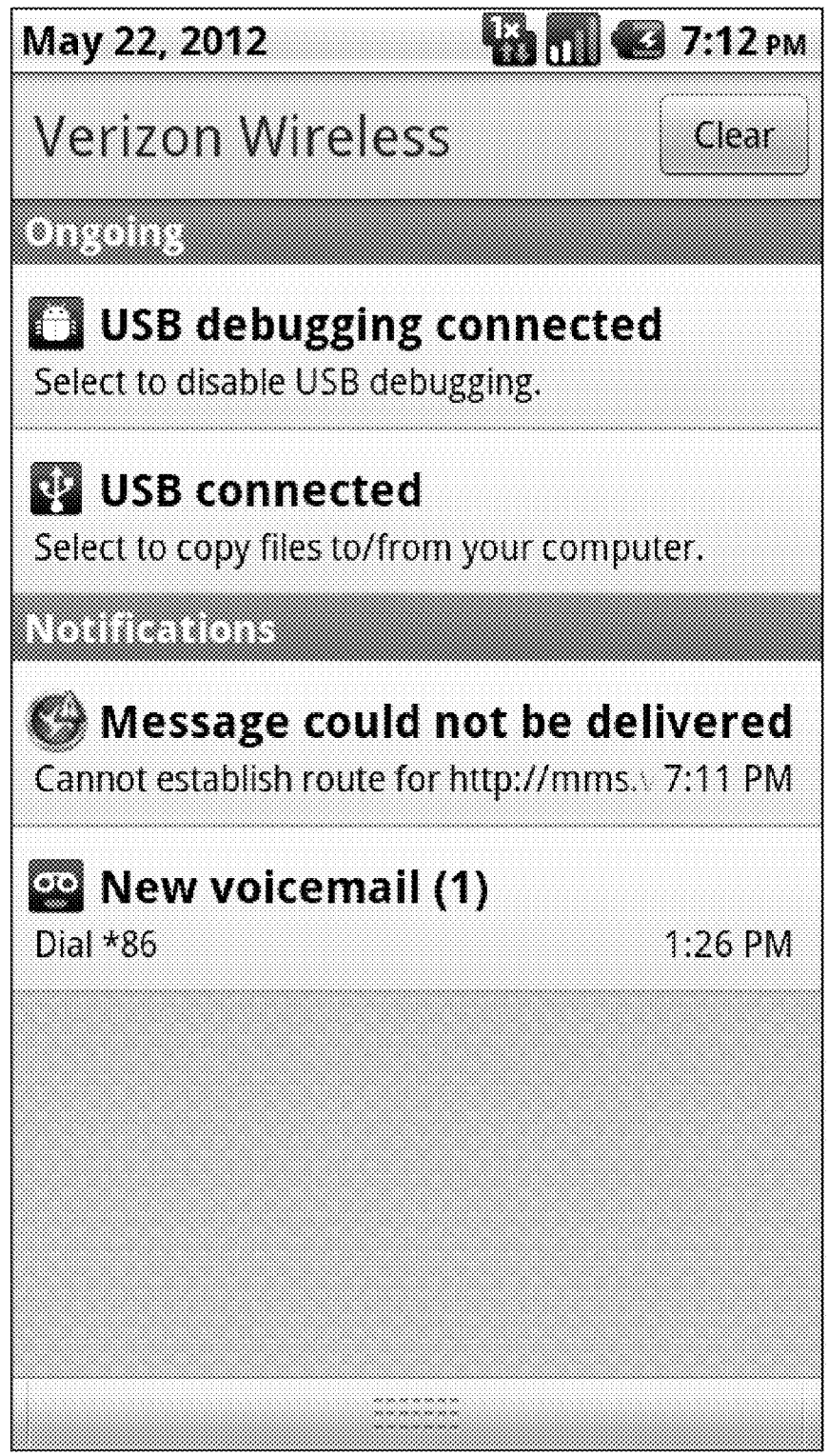
FIG. 7 is a non-limiting illustrative example of error notification that a secure communiqué was not successfully sent to the at least one selected peer.

If an error occurred during the transmission of the communiqué to the at least one peer system, the non-limiting exemplary implementation notifies the user of its occurrence. FIG. 6 shows a red warning triangle near the Protected Mobility application icon in the system status bar, alerting the user to the condition. If the user displays the status area of the system, further information about the error can be garnered as depicted in FIG. 7. Specifically FIG. 7 is alerting the user that no route to an infrastructure system could be established over the current available communications mediums. It can be easily envisioned by those schooled in the art that additional or alternative status information can be easily present to a user or calling function, and provided in different ways.

Figure 8:
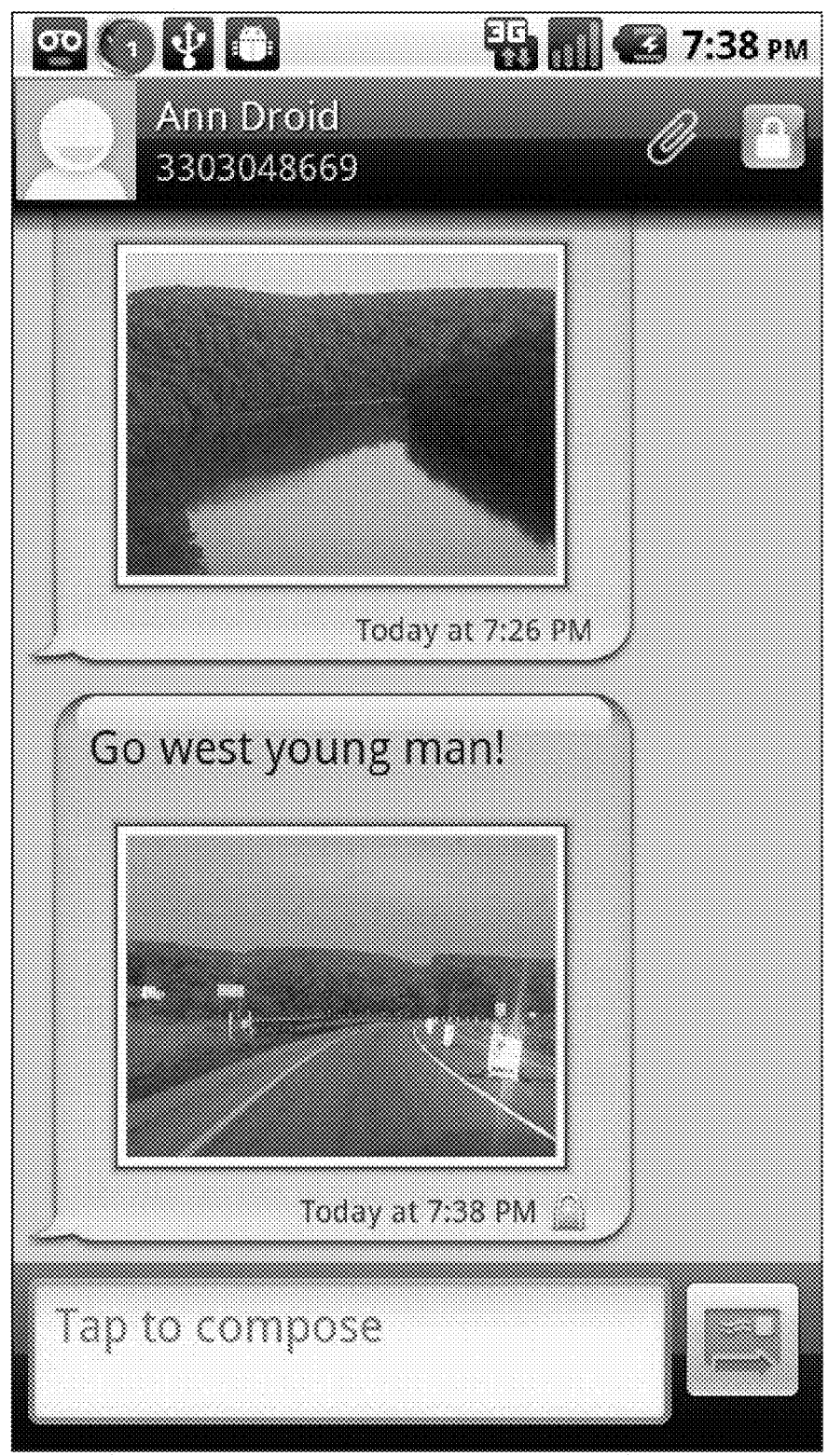
FIG. 8 is a non-limiting illustrative example of a display showing both a non-secure and secure multimedia communiqué was received from the at least one peer.

If no error occurs during transmission, and the at least one peer system receives the communiqué, the non-limiting exemplary implementation displays the message to the user. FIG. 8 depicts to digital photographic images that were received. A user can easily detect that a message thread has an attachment by the appearance of the paperclip icon in the title bar along with who the messages came from. In this illustrative example, the user can easily detect which content was received securely or not by the appearance of a gold lock icon at the bottom of each message. The picture displayed in the top of FIG. 8 was sent without additional security as there is no lock icon displayed. However the picture displayed at the bottom of FIG. 8 has a gold lock icon indicating that the message was received securely.

Figure 9:
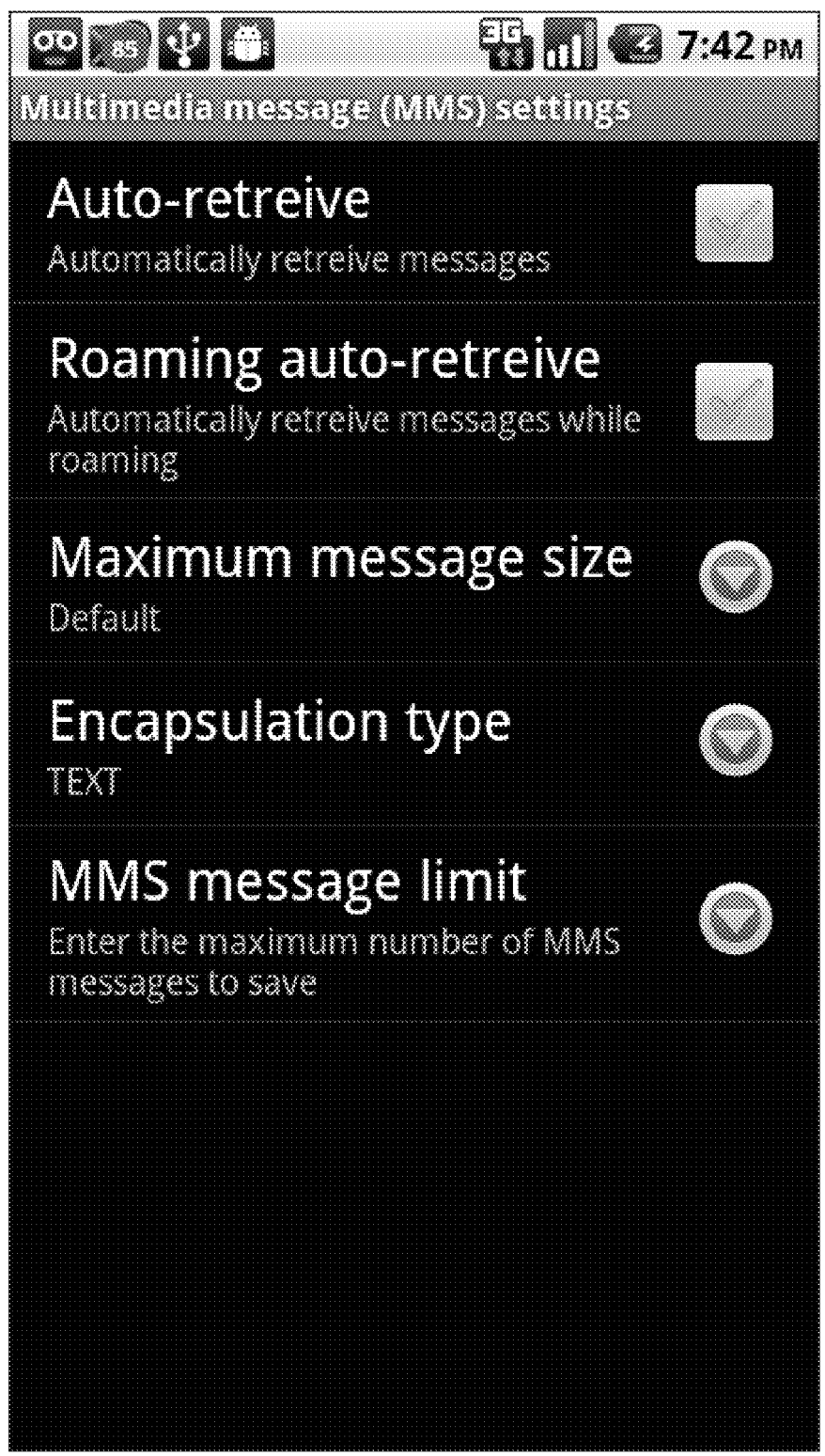
FIG. 9 is a non-limiting illustrative example of a input/status screen showing potential preferences used to control the transmission, reception, and storage of multimedia message content.

FIG. 9 depicts potential preferences or attributes used for the sending and receiving of multimedia content in the non-limiting exemplary implementation. The user may select, including but not limited to, how and when to retrieve or send multimedia message, what maximum size to enforce during send operations, what encapsulation type to used for encrypted messages, and how many multimedia messages should be kept per conversation thread.

Figure 10:
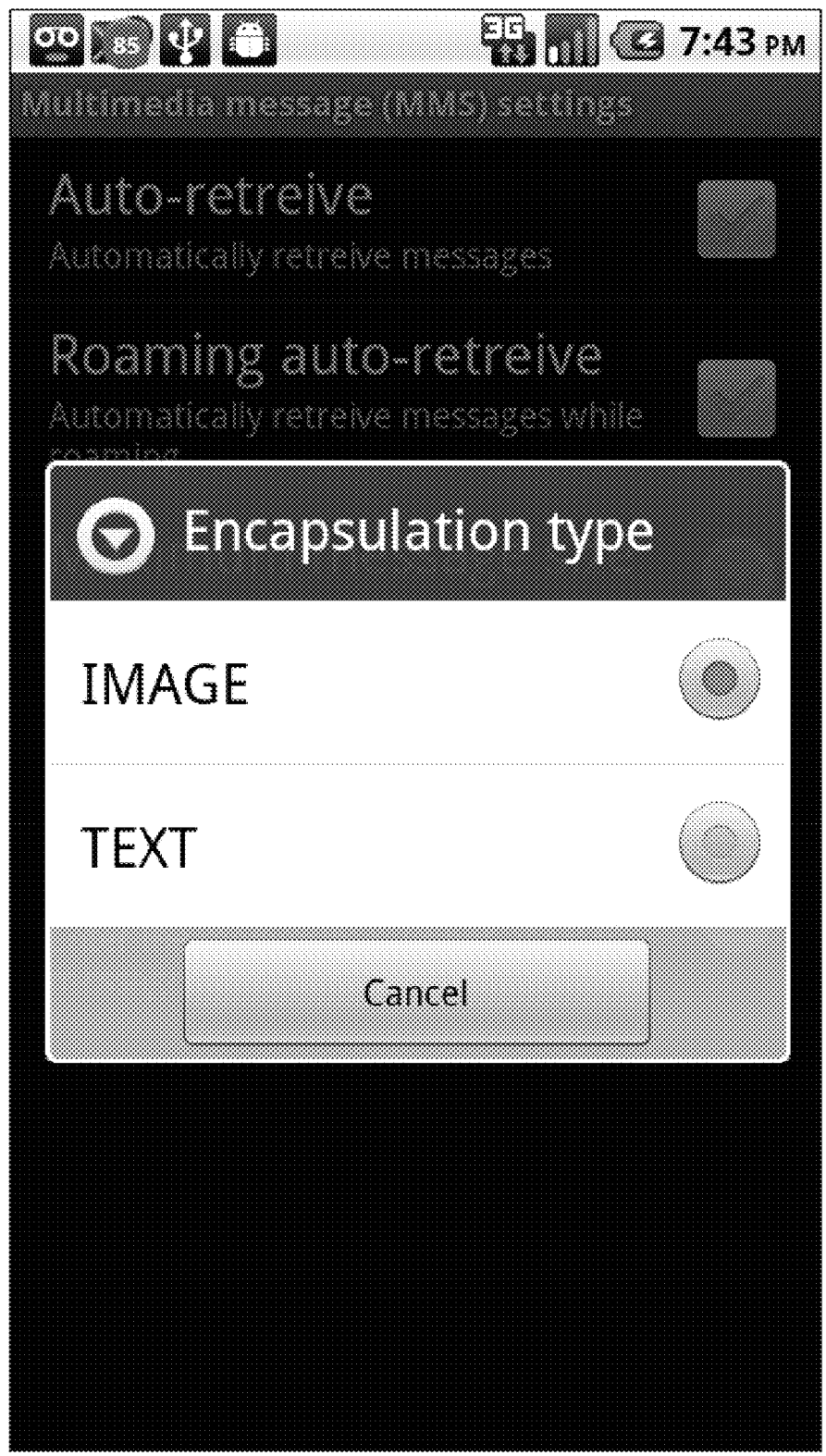
FIG. 10 is a non-limiting illustrative example of a input/status screen showing the selection of potential encapsulation types used for the transmission multimedia message content.

FIG. 10 further depicts what encapsulation types may be available to encode outbound secure multimedia content.

Figure 11:
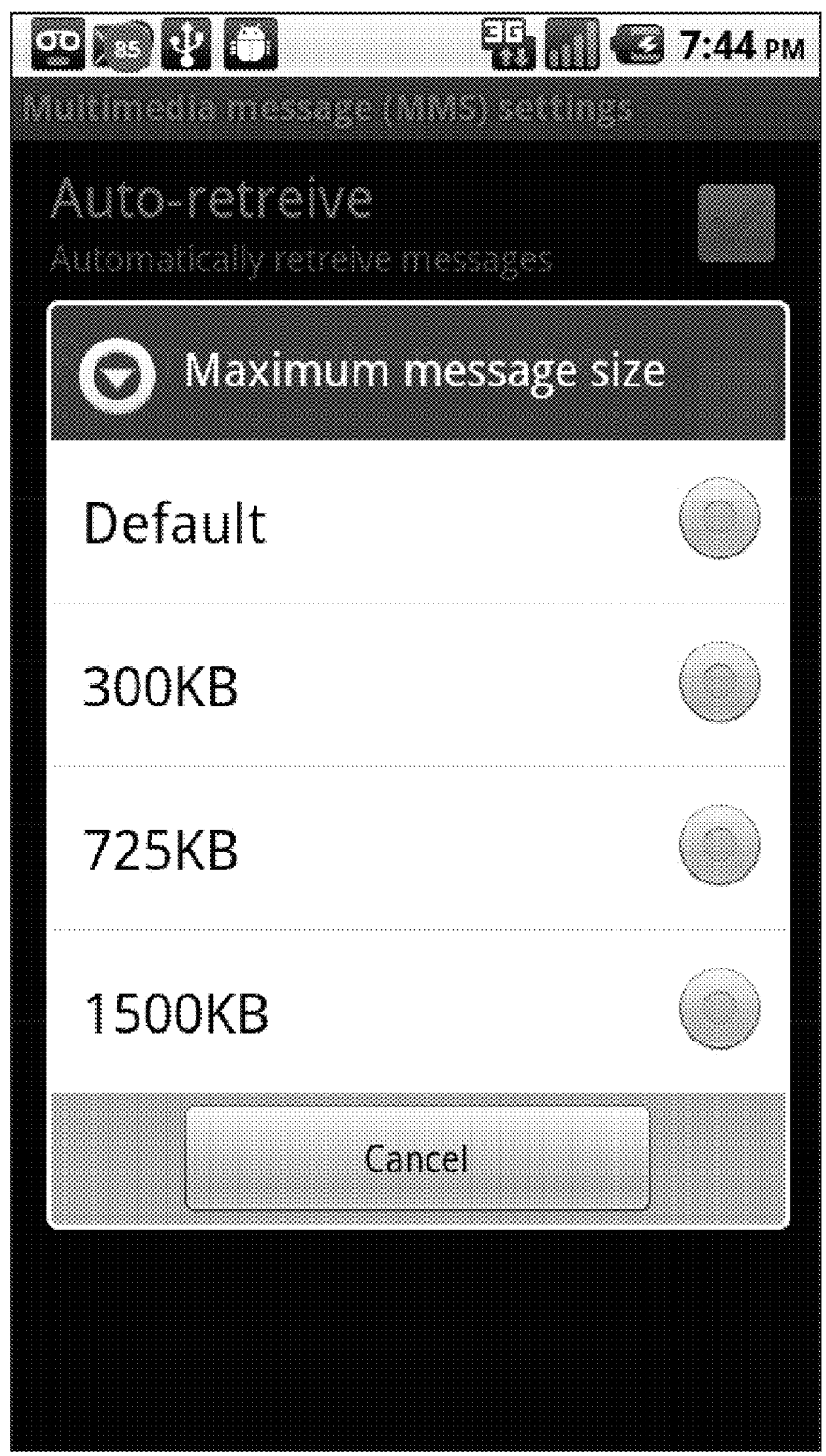
FIG. 11 is a non-limiting illustrative example of a input/status screen showing the selection of potential size preferences used for the transmission of multimedia message content.

FIG. 11 further depicts what size limitations may be enforced for outbound multimedia content.

Figure 12:
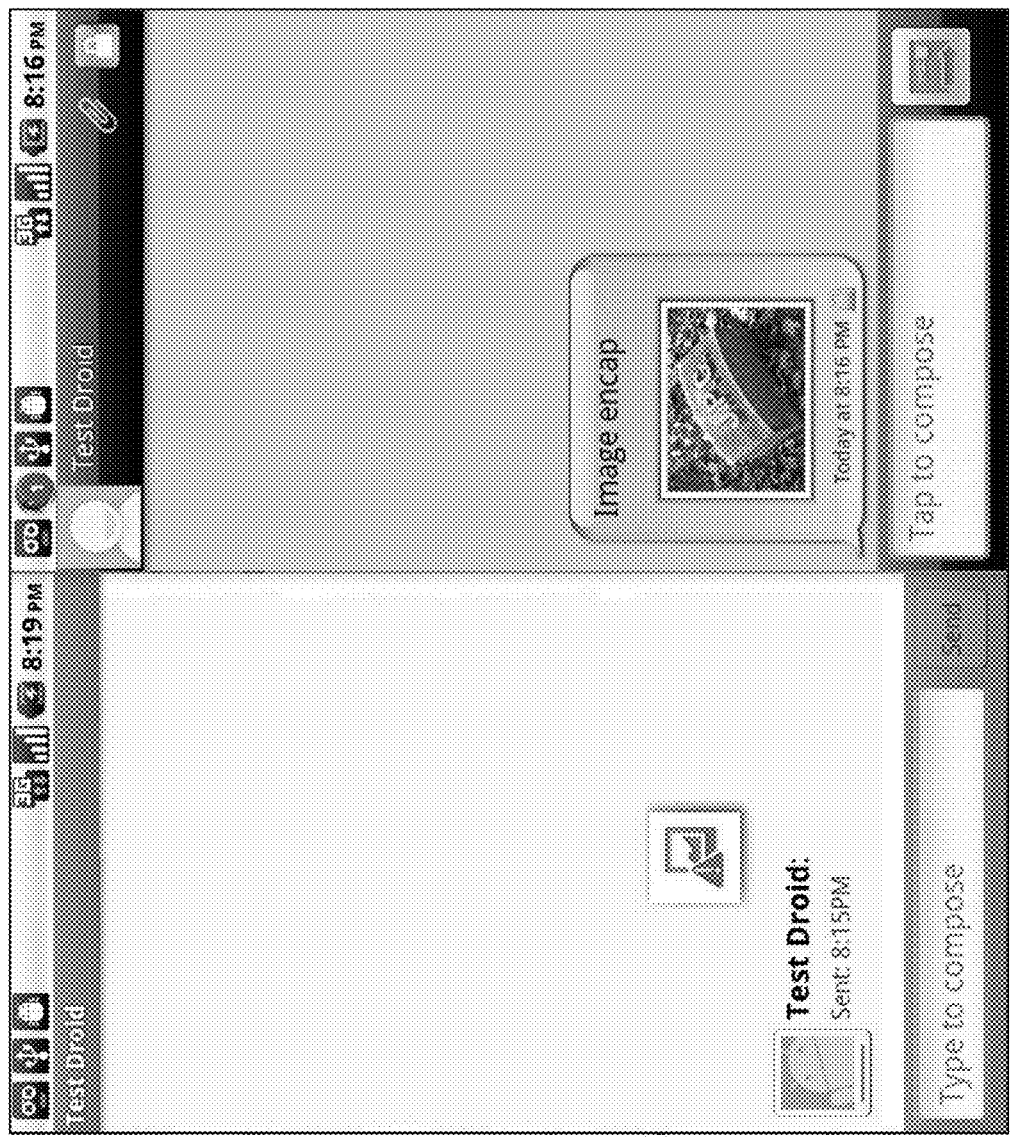
FIG. 12 is a non-limiting illustrative example of a side-by-side comparison of display screens showing the reception of secure multimedia content via a traditional multimedia application and the protected MMS application using a non-limiting illustrative method of image encapsulation of multimedia content.

FIG. 12 depicts a side-by-side comparison a traditional messaging application and a non-limiting exemplary implementation of the protected MMS application displaying secure multimedia content. On the left of FIG. 12 is the display of the traditional application. Since it is unable to correctly display the content, the traditional application indicated there was a problem decoding the photographic by displaying an icon with a warning triangle. However the right hand side of FIG. 12 is the display of the Protected Mobility application. The same undecodable communiqué received by the traditional messaging application is now correctly displayed using the image encapsulation technique.

Figure 13:
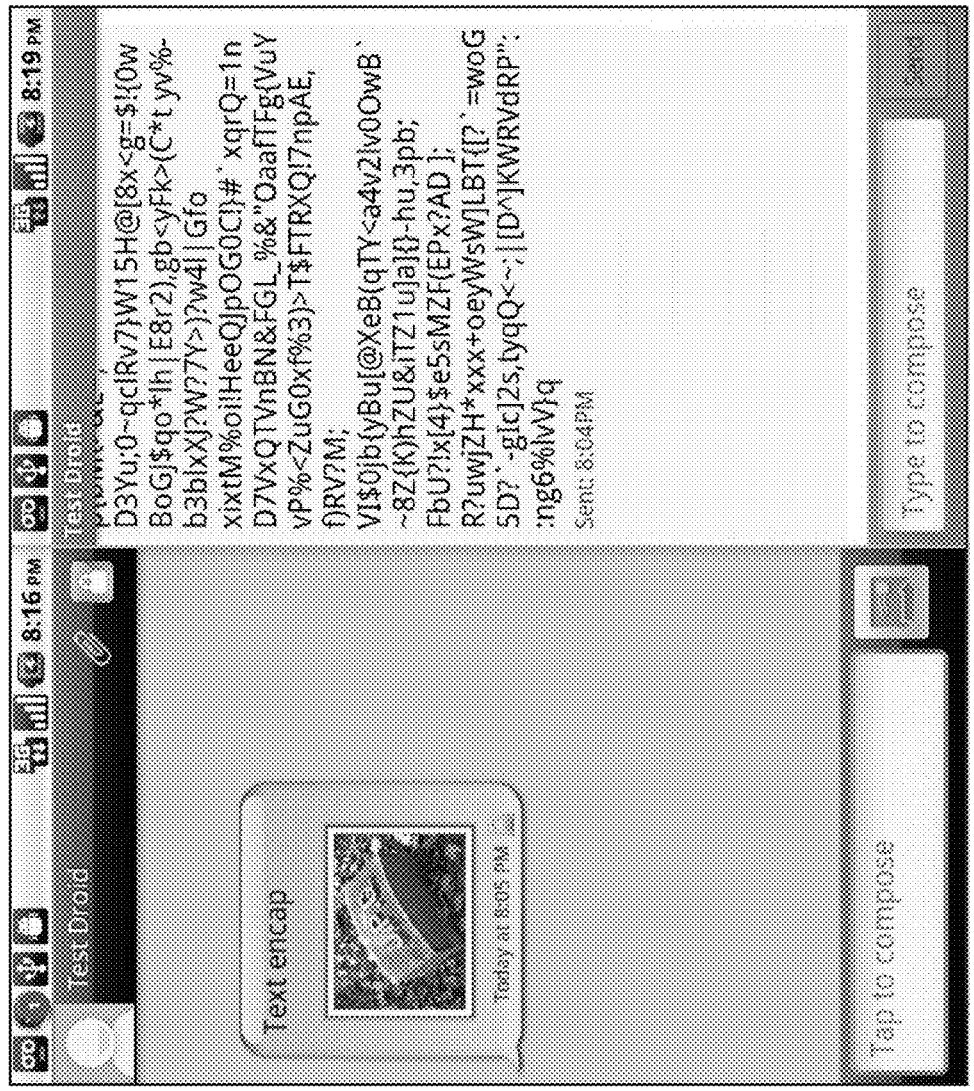
FIG. 13 is a non-limiting illustrative example of a side-by-side comparison of display screens showing the reception of secure multimedia content via the protected MMS application and a traditional multimedia application using a non-limiting illustrative method of textual encapsulation of multimedia content.

FIG. 13 depicts a side-by-side comparison a traditional messaging application and a non-limiting exemplary implementation of the protected MMS application displaying secure multimedia content. On the left of FIG. 13 is the display of the Protected Mobility application. However unlike the process depicted in FIG. 12, FIG. 13 displays the digital photograph that was secured and encapsulated using a textual technique. On the right hand side of FIG. 13, the traditional application no longer displays an icon with a warning triangle on the screen, but a series of printable ASCII characters.

Figure 14:
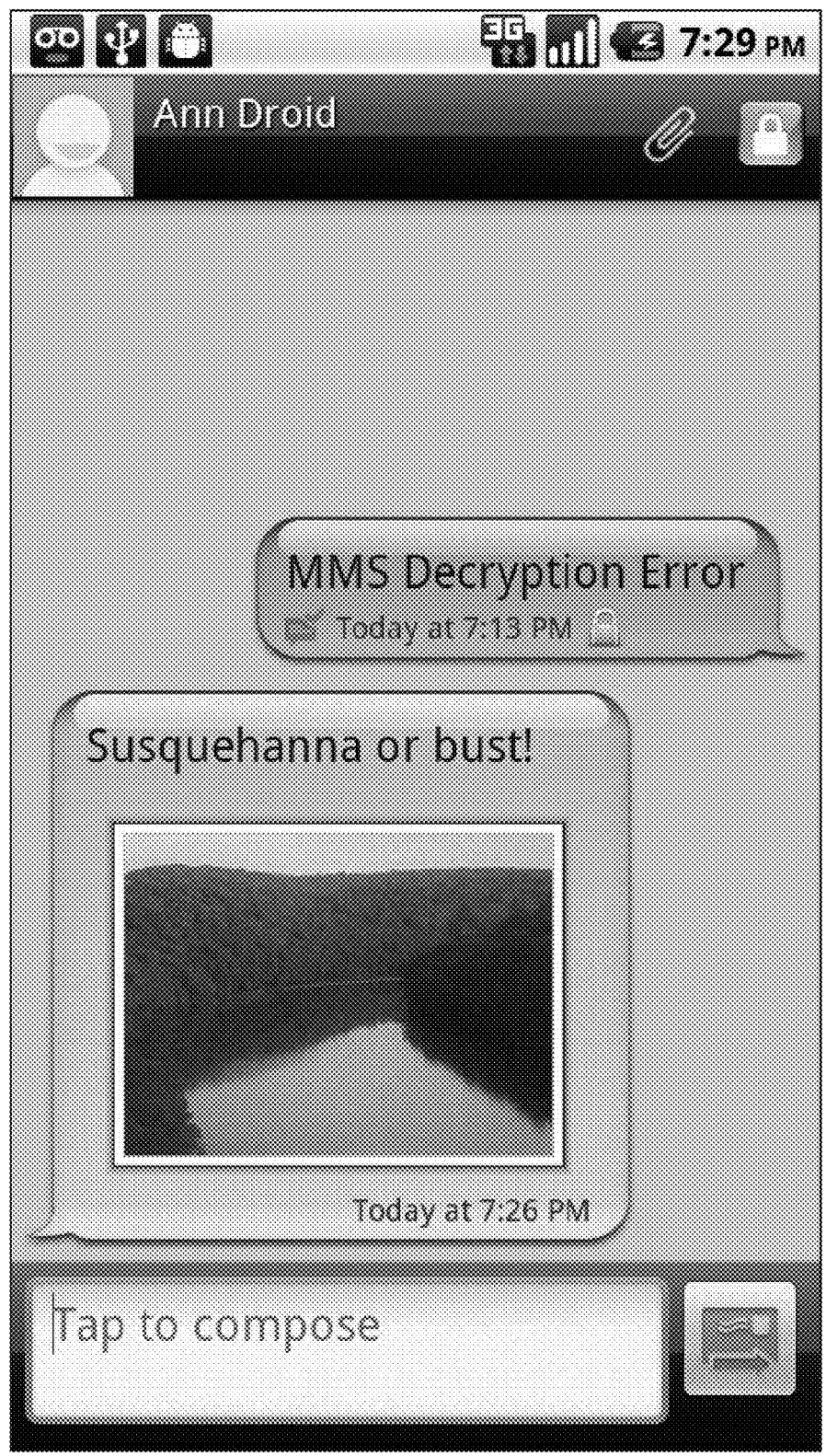
FIG. 14 is a non-limiting illustrative example of a traditional messaging application's display screen depicting it is unable to correctly display secure multimedia content.

FIG. 14 depicts what happens if secure multimedia is received corrupted in the non-limiting illustrative implementation of the protected MMS application. In this example the user is presented with an informational message indicating that the system was unable to decrypt the at least one part secured content. Unsecured content can still be displayed as depicted by the picture at the bottom of FIG. 14.

Figure 15:
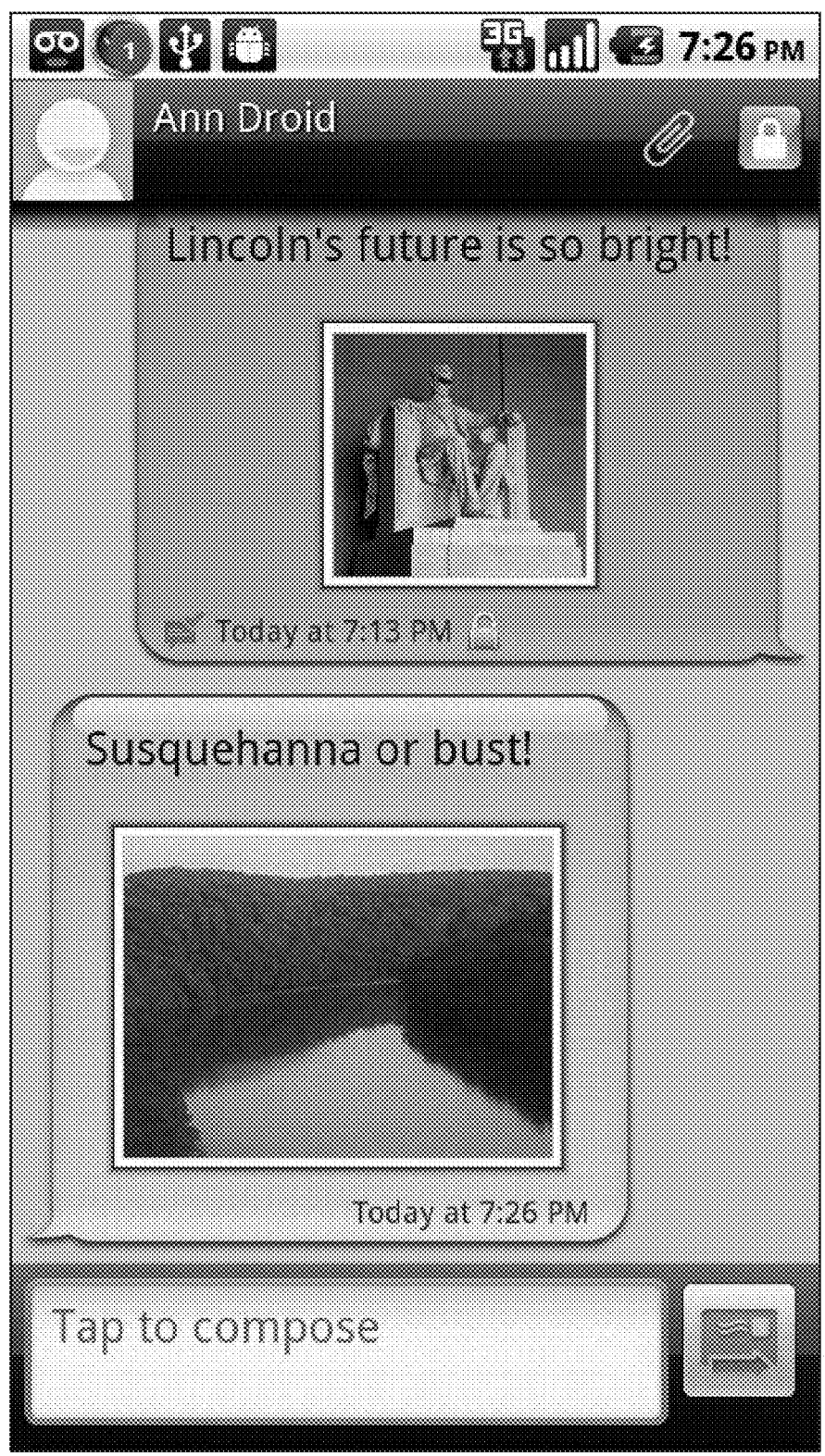
FIG. 15 is a non-limiting illustrative example of a protected MMS application's screen that depicts both secure and insecure multimedia messages being displayed within the same conversation thread.

In the non-limiting exemplary implementation additional information can be provide to the user as part of the message. The edited secure digital photograph of the Lincoln Memorial displayed at the top of FIG. 15 indicates that it was successfully sent at 7:13 PM securely. The message bubble with the checkmark next to it indicates that the message was sent without error. Additional information can be easily conveyed through this mechanism such as a received receipt or if the message was viewed by the at least on peer. Again the picture at the bottom of FIG. 15 shows that both secure and insecure information can be displayed to the user simultaneously.

Figure 16:
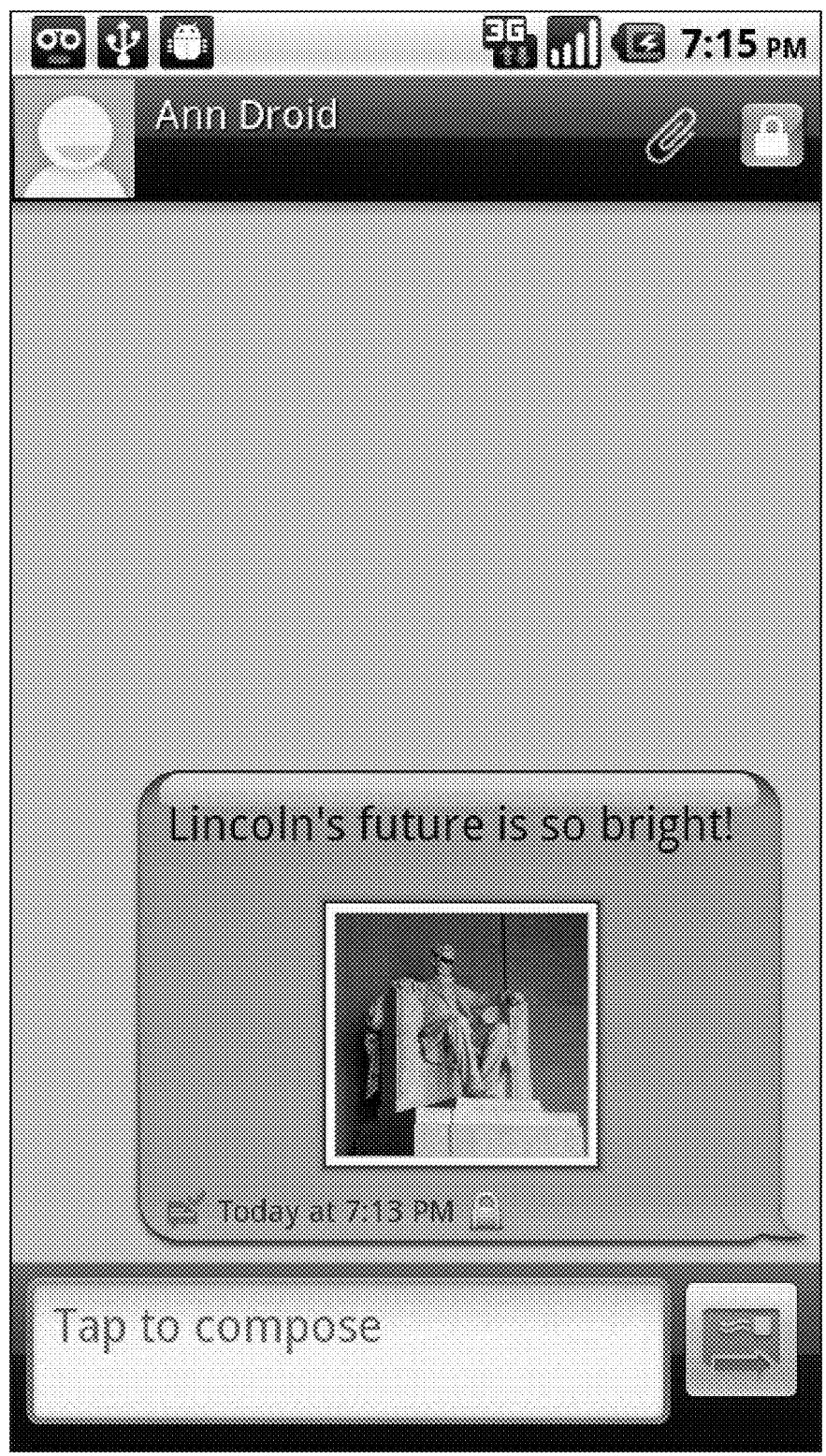
FIG. 16 is a non-limiting illustrative example of a protected MMS application's display screen depicting the reception of unsecure multimedia message content.

FIG. 16 depicts that textual content can be associated with other multimedia content whether it is sent in the same message or communicated separately and later merged during the decapsulation and decryption process.

Figure 17:
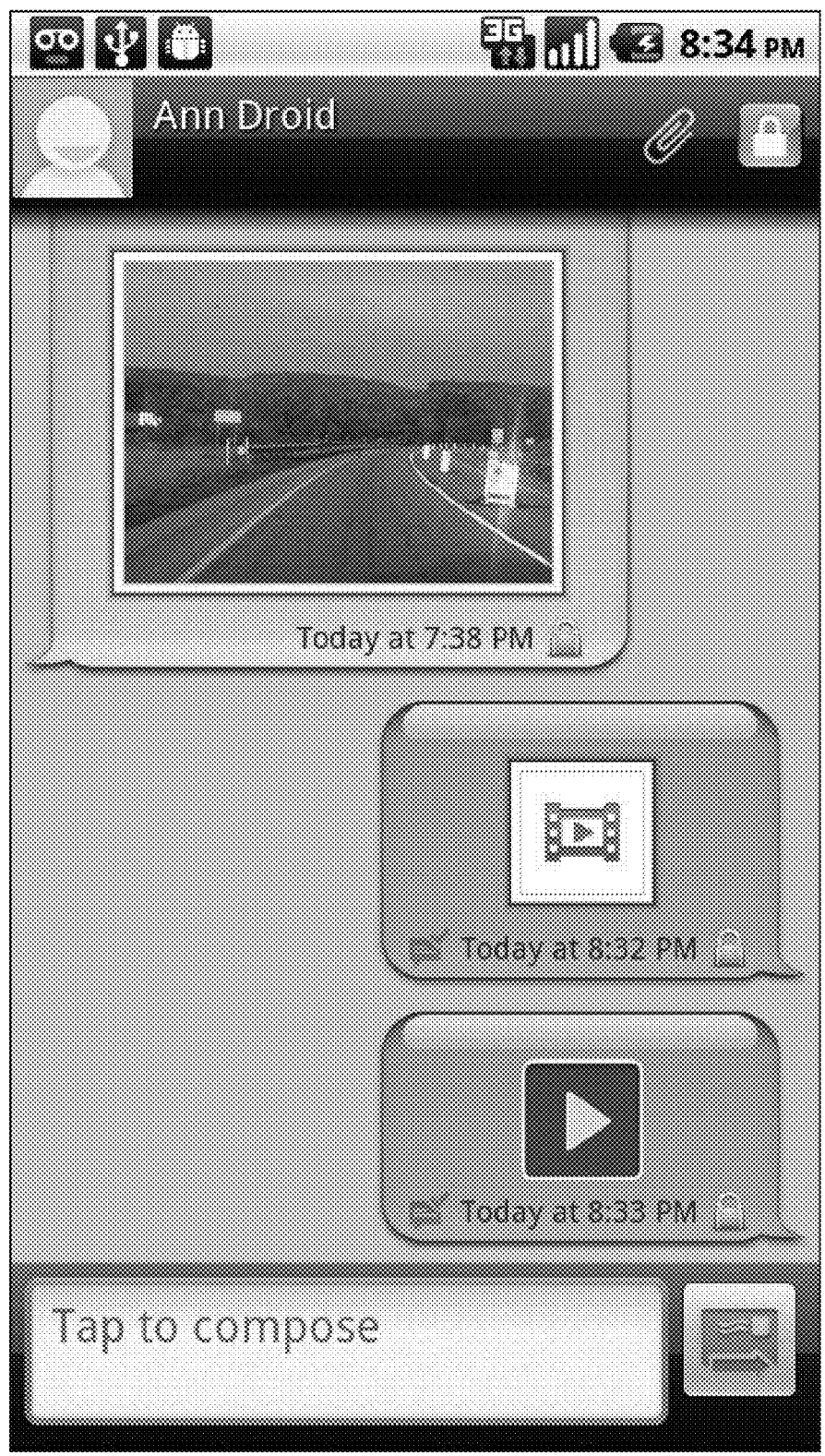
FIG. 17 is a non-limiting illustrative example of a protected MMS application's display screen depicting that the transmission of secure multimedia message content was successfully sent.

FIG. 17 depicts that other multimedia types can be communicated securely, including but not limited to video and audio data as seen at the bottom of the display.

Figure 18:
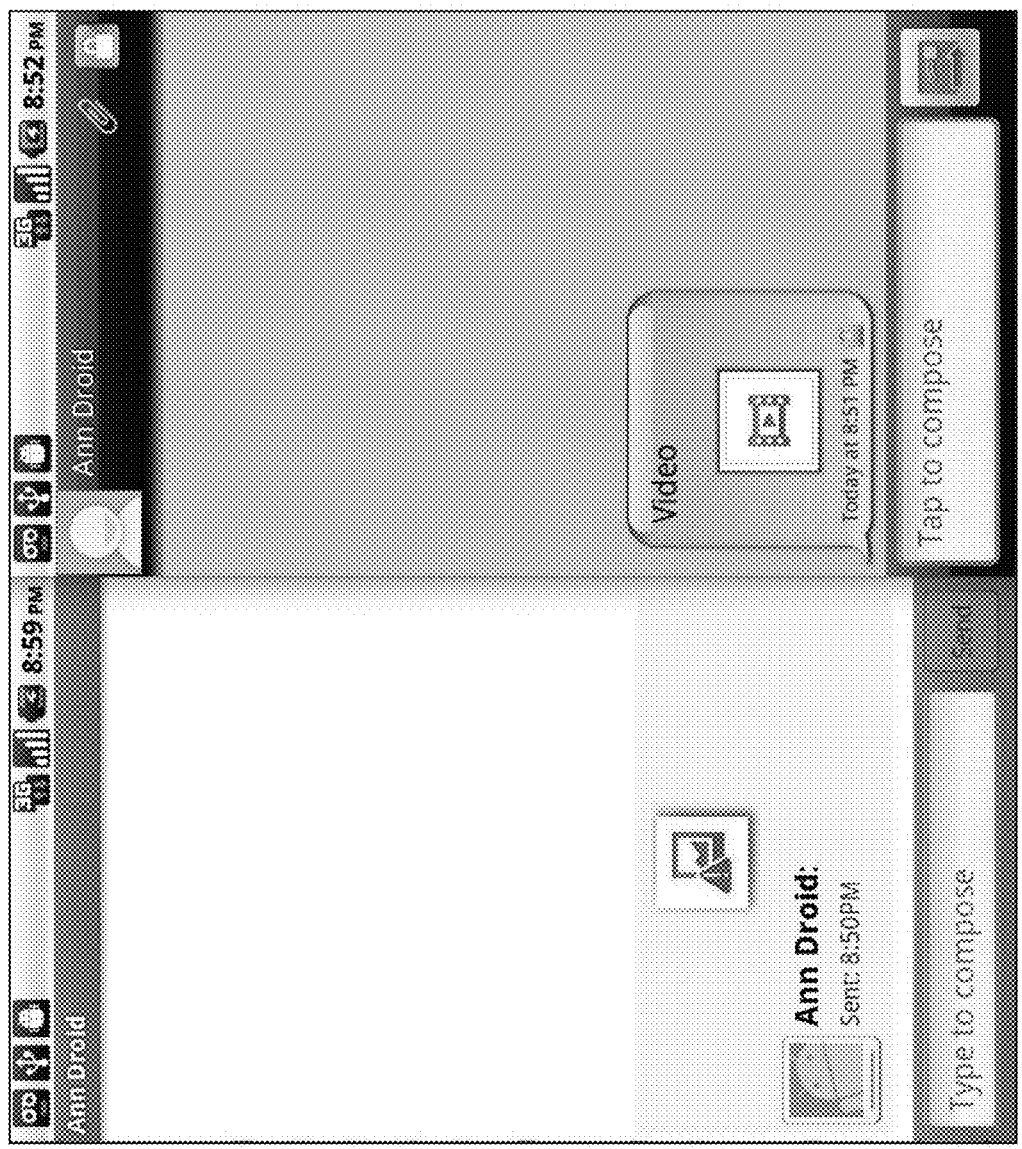
FIG. 18 is a non-limiting illustrative example of a protected MMS application's display screen depicting that the transmission of other types of secure multimedia message content such as a video or audio clip was successfully sent.

FIG. 18 depicts a side-by-side comparison a traditional messaging application and a non-limiting exemplary implementation of the protected MMS application displaying secure multimedia content. On the right of FIG. 18 is the display of the secured video content that was received from the at least on peer system. However on the left of FIG. 18 is the display of the traditional messaging application. Of importance to note is that even though the secured content is of type video, due to the encapsulation type used by the Protected Mobility application to communicate the multimedia content, the traditional application determines that the content is an undecodable digital photographic image as depicted by the icon displayed on the screen.

As used herein, "non-transitory" excludes only a transitory, propagating signal per se. Furthermore, the term "non-transitory storage medium" means any kind of non-transitory storage technology including but not limited to semiconductor memory of any form (including but not limited to read only memory, programmable read only memory, electrically eraseable programmable read only memory, programmable gate arrays, random access memory, magnetic memory, bubble memory, etc., whether volatile or non-volatile); optical memory including but not limited to optical disks whether writable and/or erasable; magnetic storage; display storage; and storage of any kind of information on any kind of writable, eraseable and/or readable carrier, device or medium of any form whatsoever.

While the technology herein has been described in connection with what is presently considered to be the most practical and preferred embodiments, the invention is not to be limited to the disclosed embodiments, but on the contrary, is intended to cover various modifications and equivalent arrangements included within the spirit and scope of the claims.

The invention claimed is:

1. In a method for conveying multimedia information to at least one message receiving device through intermediary infrastructure components, comprising:

transforming, using at least a first set of cryptographic material, a first message comprising multimedia information;

encrypting the at least first set of cryptographic material using a second, different set of cryptographic material to generate a second message which includes the encrypted at least first set of cryptographic material as part of the second message, the second message being loosely coupled with the first transformed message; and encapsulating the first transformed message into a different format within a maximum selected size that will pass through intermediary infrastructure components based on the different format and the maximum selected size being within a message size limit of the intermediary infrastructure components;

a method of receiving and recovering multimedia information comprising:

receiving the encapsulated first transformed message from the intermediary infrastructure components with the at least one message receiving device, receiving the second message with the at least one message receiving device;

de-encapsulating, with a processor in the at least one message receiving device, the received encapsulated first transformed message from the format that will pass through the intermediary infrastructure components, to recover the first message transformed using the first set of cryptographic material;

decrypting, with the at least one message receiving device, the information in the second message to recover the at least first set of cryptographic material; and with the at least one message receiving device, using the recovered at least first set of cryptographic material to transform the recovered first message and recover the multimedia information.

* * * * *